(12) United States Patent
Shin et al.

(10) Patent No.: US 10,688,955 B2
(45) Date of Patent: Jun. 23, 2020

(54) CENTER CURTAIN AIRBAG FOR VEHICLE

(71) Applicants: Hyundai Motor Company, Seoul (KR); Kia Motors Corporation, Seoul (KR)

(72) Inventors: Pyoung Sik Shin, Yongin-si (KR); Jae Ho Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 136 days.

(21) Appl. No.: 16/007,915

(22) Filed: Jun. 13, 2018

(65) Prior Publication Data
US 2019/0241148 A1    Aug. 8, 2019

(30) Foreign Application Priority Data
Feb. 2, 2018 (KR) .......................... 10-2018-0013414

(51) Int. Cl.
*B60R 21/2338* (2011.01)
*B60R 21/015* (2006.01)
*B60R 21/214* (2011.01)
*B60R 21/232* (2011.01)
(Continued)

(52) U.S. Cl.
CPC .... *B60R 21/2338* (2013.01); *B60R 21/01512* (2014.10); *B60R 21/214* (2013.01); *B60R 21/232* (2013.01); *B60R 2021/161* (2013.01); *B60R 2021/23161* (2013.01); *B60R 2021/23386* (2013.01); *B60R 2021/23388* (2013.01)

(58) Field of Classification Search
CPC . B60R 21/2338; B60R 21/232; B60R 21/214; B60R 21/01512; B60R 2021/23388; B60R 2021/23386; B60R 2021/23161; B60R 2021/161
See application file for complete search history.

(56) References Cited

U.S. PATENT DOCUMENTS 2,834,606 A * 5/1958 Bertrand ................. B60R 21/20
    280/730.1
3,664,682 A * 5/1972 Wycech .................. B60R 21/08
    280/730.1
(Continued)

FOREIGN PATENT DOCUMENTS

KR    10-2013-0031458 A    3/2013

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

A center curtain airbag for a vehicle may include an upper cushion device configured to be deployed from a roof device of the vehicle into a space between a front seat and a rear seat when an inflator operates; a lower cushion device connecting and communicating with the upper cushion device and configured to extend downwardly from the upper cushion device; and a guide tether including a first end portion coupled to the upper cushion device or the roof device, and a second end portion coupled to a lower end portion of the lower cushion device, the guide tether being configured to provide, when the lower cushion device along with the upper cushion device is deployed, a pulling force to the lower cushion device so that the lower cushion device may be deformed to protrude toward the front and rear seats.

18 Claims, 17 Drawing Sheets

(51) Int. Cl.
*B60R 21/16* (2006.01)
*B60R 21/231* (2011.01)

(56) References Cited

U.S. PATENT DOCUMENTS

| | | | | |
|---|---|---|---|---|
| 3,774,936 A * | 11/1973 | Barnett | B60R 21/214 | 280/730.1 |
| 3,836,168 A * | 9/1974 | Nonaka | B60R 21/08 | 280/733 |
| 4,298,214 A * | 11/1981 | Brown, Jr. | B60R 21/213 | 280/735 |
| 5,470,103 A * | 11/1995 | Vaillancourt | B60R 21/214 | 280/730.1 |
| 6,722,691 B1 * | 4/2004 | Håland | B60R 21/16 | 280/730.1 |
| 6,932,380 B2 * | 8/2005 | Choi | B60R 21/232 | 280/730.1 |
| 7,195,276 B2 * | 3/2007 | Higuchi | B60R 21/231 | 280/729 |
| 7,926,840 B1 * | 4/2011 | Choi | B60R 21/214 | 280/730.1 |
| 7,942,444 B2 * | 5/2011 | Steinbach | B60R 21/232 | 280/730.2 |
| 8,087,690 B2 * | 1/2012 | Kim | B60R 21/214 | 280/729 |
| 8,403,358 B2 * | 3/2013 | Choi | B60R 21/214 | 280/728.2 |
| 8,414,017 B2 * | 4/2013 | Lee | B60R 21/231 | 280/730.1 |
| 8,573,634 B2 * | 11/2013 | Choi | B60R 21/214 | 280/730.1 |
| 8,579,321 B2 * | 11/2013 | Lee | B60R 21/214 | 280/729 |
| 8,602,448 B2 * | 12/2013 | Choi | B60R 21/214 | 280/730.1 |
| 8,807,593 B2 * | 8/2014 | Lee | B60R 21/233 | 280/730.1 |
| 8,851,509 B1 * | 10/2014 | Choi | B60R 21/217 | 280/730.1 |
| 9,016,717 B1 * | 4/2015 | Clauser | B60R 21/233 | 280/729 |
| 9,446,733 B2 * | 9/2016 | Pausch | B60R 21/231 | |
| 9,676,361 B2 * | 6/2017 | Smith | B60R 21/232 | |
| 9,725,064 B1 * | 8/2017 | Faruque | B60N 2/143 | |
| 9,771,049 B2 * | 9/2017 | Lee | B60R 21/2338 | |
| 9,994,182 B1 * | 6/2018 | Jaradi | B60R 21/214 | |
| 10,272,868 B2 * | 4/2019 | Jaradi | B60R 21/232 | |
| 10,279,770 B2 * | 5/2019 | Faruque | B60R 21/0136 | |
| 10,315,609 B2 * | 6/2019 | Thomas | B60R 21/231 | |
| 10,343,642 B2 * | 7/2019 | Faruque | B60R 21/20 | |
| 10,407,018 B2 * | 9/2019 | Sundararajan | B60R 21/214 | |
| 10,471,923 B2 * | 11/2019 | Jimenez | B60R 21/231 | |
| 10,486,637 B2 * | 11/2019 | Thomas | B60R 21/13 | |
| 10,486,639 B2 * | 11/2019 | Nagasawa | B60R 21/232 | |
| 2010/0133797 A1 * | 6/2010 | Kim | B60R 21/214 | 280/743.2 |
| 2012/0133114 A1 * | 5/2012 | Choi | B60R 21/214 | 280/728.2 |
| 2013/0069348 A1 * | 3/2013 | Choi | B60R 21/214 | 280/730.2 |
| 2018/0065585 A1 * | 3/2018 | Jaradi | B60R 21/233 | |
| 2018/0215338 A1 * | 8/2018 | Faruque | B60R 21/237 | |
| 2018/0222432 A1 * | 8/2018 | Schneider | B60R 21/214 | |
| 2018/0272985 A1 * | 9/2018 | Nagasawa | B60R 21/2338 | |
| 2019/0161049 A1 * | 5/2019 | Thomas | B60R 21/215 | |
| 2019/0202391 A1 * | 7/2019 | Cho | B60R 21/214 | |
| 2019/0217804 A1 * | 7/2019 | Cho | B60R 21/232 | |
| 2019/0366968 A1 * | 12/2019 | Park | B60R 21/232 | |
| 2019/0375363 A1 * | 12/2019 | Abe | B60R 21/233 | |

* cited by examiner

CENTER CURTAIN AIRBAG FOR VEHICLE

CROSS REFERENCE TO RELATED APPLICATION

The present application claims priority to Korean Patent Application No. 10-2018-0013414 filed on Feb. 2, 2018, the entire contents of which is incorporated herein for all purposes by this reference.

BACKGROUND OF THE INVENTION

Field of the Invention

The present invention relates to a center curtain airbag for safely protecting both an occupant on a front seat and an occupant on a rear seat when a vehicle collision occurs.

Description of Related Art

A vehicle is provided with a safety device to safely protect occupants from impact generated in an accident such as a collision or overturning. A safety belt for restraining the body of an occupant and an airbag for relieving impact generated when an occupant collides with a vehicle body are used as the safety device. Different kinds of airbags, e.g., a driver seat airbag disposed in a steering wheel, and a passenger seat airbag disposed in an instrument panel of a passenger seat, are disposed in corresponding portions of the vehicles in various ways, as needed.

Typically, a passenger compartment of a vehicle is divided into a front space for an occupant on a front seat, and a rear space for an occupant on a rear seat. There is a problem in that, when a vehicle collision occurs, the occupant on the rear seat is moved forward by inertia and may lead to a collision between the internal occupants.

The number of autonomous vehicles is recently increasing. For the sake of convenience of occupants, swivel seats may be used in such an autonomous vehicle. The orientation of the swivel seats may be adjusted such that the occupant on the front seat and the occupant on the rear seat face each other or face away from each other depending on adjusted seat positions. Therefore, when a vehicle collision occurs, a collision between the occupants may be caused.

To avoid the above-mentioned problem, a center airbag configured for separating the front space and the rear space from each other has been used. However, the conventional center airbag has no self-supporting force because it is designed on the assumption that the center airbag is supported by a seatback of the front seat. As a result, there is a limitation in protecting the occupants.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a center curtain airbag that prevents a front occupant and a rear occupant from colliding with each other when a vehicle collision occurs, and has self-supporting force so that all of the occupants may be safely protected from impact.

According to one aspect, there is provided a center curtain airbag for a vehicle, including: an upper cushion device configured to be deployed from a roof device of the vehicle into a space between a front seat and a rear seat when an inflator operates; a lower cushion device connecting and communicating with the upper cushion device and configured to extend downwardly from the upper cushion device; and a guide tether including a first end portion coupled to the upper cushion device or the roof device, and a second end portion coupled to a lower end portion of the lower cushion device, the guide tether being configured to provide, when the lower cushion device along with the upper cushion device is deployed, a pulling force to the lower cushion device so that the lower cushion device may be deformed to protrude toward the front and rear seats.

The lower cushion device may include a front chamber and a rear chamber that are diverged from the lower end portion of the upper cushion device forward and rearward, respectively. The guide tether may include: a first tether including a first end portion coupled to the upper cushion device or the roof device, a second end portion coupled to any one of the front chamber and the rear chamber; and a second tether including a first end portion coupled to the upper cushion device or the roof device, and a second end portion coupled to a remaining one of the front chamber and the rear chamber.

The first tether and the second tether may be disposed in the upper cushion device. The first end portion of the first tether may be coupled to the upper cushion device or the roof device, and the second end portion thereof may pass downward through the lower end portion of the upper cushion device and be coupled to a lower end portion of the front chamber. The first end portion of the second tether may be coupled to the upper cushion device or the roof device, and the second end portion thereof may pass downward through the lower end portion of the upper cushion device and be coupled to a lower end portion of the rear chamber.

The upper cushion device may include a front branch chamber and a rear branch chamber that are diverged forward and rearward thereof, respectively. The first tether and the second tether may be disposed between the front branch chamber and the rear branch chamber. The first end portion of the first tether may be coupled to the front branch chamber, and the second end portion thereof may be coupled to a lower end portion of the front chamber, while the front end portion of the second tether may be coupled to the rear branch chamber, and a second end portion thereof may be coupled to a lower end portion of the rear chamber.

The first tether may be disposed in a front end portion of the upper cushion device, and the first end portion of the first tether may be coupled to the upper cushion device or the roof device while the second end portion thereof may pass downward through the lower end portion of the upper cushion device and be coupled to a lower end portion of the front chamber. The second tether may be disposed in a rear end portion of the upper cushion device, and the first end portion of the second tether may be coupled to the upper cushion device or the roof device while the second end portion thereof may pass downward through the lower end portion of the upper cushion device and be coupled to a lower end portion of the rear chamber.

The first tether and the second tether may be disposed in the upper cushion device. The first end portion of the first tether may be coupled to the upper cushion device or the roof device, and the second end portion thereof may pass forward through the lower end portion of the upper cushion device and be coupled to a lower end portion of the front chamber. The first end portion of the second tether may be coupled to the upper cushion device or the roof device, and the second end portion thereof may pass rearward through the lower end portion of the upper cushion device and be coupled to a lower end portion of the rear chamber.

The first tether may be disposed in a front end portion of the upper cushion device, and the first end portion of the first tether may be coupled to the upper cushion device or the roof device while the second end portion thereof may pass rearward through the lower end portion of the upper cushion device and be coupled to a lower end portion of the rear chamber. The second tether may be disposed in a rear end portion of the upper cushion device, and the first end portion of the second tether may be coupled to the upper cushion device or the roof device while the second end portion thereof may pass forward through the lower end portion of the upper cushion device and be coupled to a lower end portion of the front chamber.

Each of the first tether and the second tether may include a pair of tethers, and a pair of first tethers and another pair of second tethers may be respectively provided with support panels.

A dead zone may be formed in a junction of the upper cushion device and the lower cushion device.

One or more dead zones may be further formed in the lower cushion device along a longitudinal direction of the lower cushion device.

The center curtain airbag may further include a cutting device disposed in the roof device or the upper cushion device and configured to cut or not to cut the guide tether so that deployment positions of the front chamber and the rear chamber are adjusted.

The center curtain airbag may further include a controller configured to control the cutting device and receive position information related to the front seat and the rear seat. When the front seat and the rear seat are oriented toward a deployment position of the upper cushion device, the controller may be configured to control the cutting device not to cut the first tether and the second tether so that the front chamber and the rear chamber may be deformed in bent shapes when inflating.

When only any one of the front seat and the rear seat is oriented toward the deployment position of the upper cushion device, the controller may be configured to control the cutting device not to cut one of the first tether and the second tether that corresponds to the associated seat.

When the front seat and the rear seat are oriented in directions opposite to the deployment position of the upper cushion device, the controller may be configured to control the cutting device to cut the first tether and the second tether.

The controller may further receive information related to whether an occupant sits on each of the front seat and the rear seat. When there is no occupant on the front seat or the rear seat, the controller may be configured to control the cutting device to cut one of the first tether and the second tether that corresponds to the associated seat.

The guide tether may include: a first tether and a third tether each including a first end portion coupled to the upper cushion device or the roof device, and a second end portion passing downward through the lower end portion of the upper cushion device and coupled to the front chamber; and a second tether and a fourth tether each including a first end portion coupled to the upper cushion device or the roof device, and a second end portion passing downward through the lower end portion of the upper cushion device and coupled to the rear chamber. The third tether may be shorter than the first tether, and the fourth tether may be shorter than the second tether.

When the front seat and the rear seat are oriented toward the deployment position of the upper cushion device and occupants respectively sit on the front seat and the rear seat, the controller may be configured to control the cutting device to cut the third tether and the fourth tether and not to cut the first tether and the second tether.

When the front seat and the rear seat are oriented toward the deployment position of the upper cushion device and an occupant sits on the front seat while there is no occupant on the rear seat, the controller may be configured to control the cutting device to cut the second tether and the third tether and not to cut the first tether and the fourth tether.

When the front seat and the rear seat are oriented toward the deployment position of the upper cushion device and an occupant sits on the front seat while there is no occupant on the rear seat, the controller may be configured to control the cutting device to cut the second tether, the third tether, and the fourth tether and not to cut the first tether.

When the front seat and the rear seat are oriented in directions opposite to the deployment position of the upper cushion device, the controller may be configured to control the cutting device to cut the first tether, the second tether, the third tether, and the fourth tether.

The guide tether may include: a first tether and a fifth tether each including a first end portion coupled to the upper cushion device or the roof device, and a second end portion passing forward through the lower end portion of the upper cushion device and coupled to the front chamber; and a second tether and a sixth tether each including a first end portion coupled to the upper cushion device or the roof device, and a second end portion passing rearward through the lower end portion of the upper cushion device and coupled to the rear chamber. The fifth tether may be longer than the first tether, and the sixth tether may be longer than the second tether.

When the front seat and the rear seat are oriented toward the deployment position of the upper cushion device and occupants respectively sit on the front seat and the rear seat, the controller may be configured to control the cutting device to cut the fifth tether and the sixth tether and not to cut the first tether and the second tether.

When the front seat and the rear seat are oriented toward the deployment position of the upper cushion device and an occupant sits on the front seat while there is no occupant on the rear seat, the controller may be configured to control the cutting device to cut the second tether and the fifth tether and not to cut the first tether and the sixth tether.

The center curtain airbag for the vehicle having the above-mentioned configuration may prevent the front occupant and the rear occupant from colliding with each other when a vehicle collision occurs. Furthermore, because self-supporting force of the center curtain airbag is secured, regardless of whether the front occupant or the rear occupant is present, all of the occupants may be safely protected.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
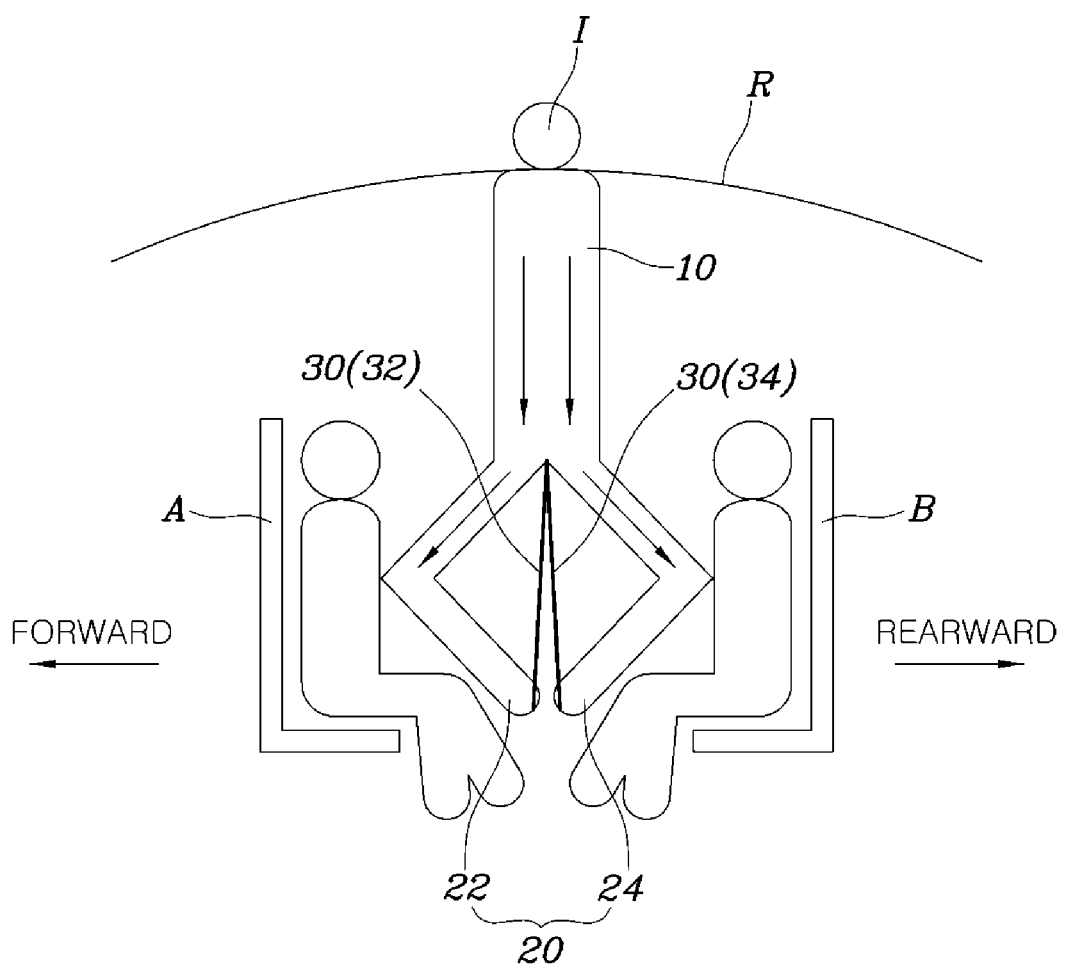
FIG. 1 is a diagram illustrating a center curtain airbag for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a center curtain airbag for a vehicle according to an exemplary embodiment of the present invention will be described in detail with reference to the appended drawings.

Figure 2:
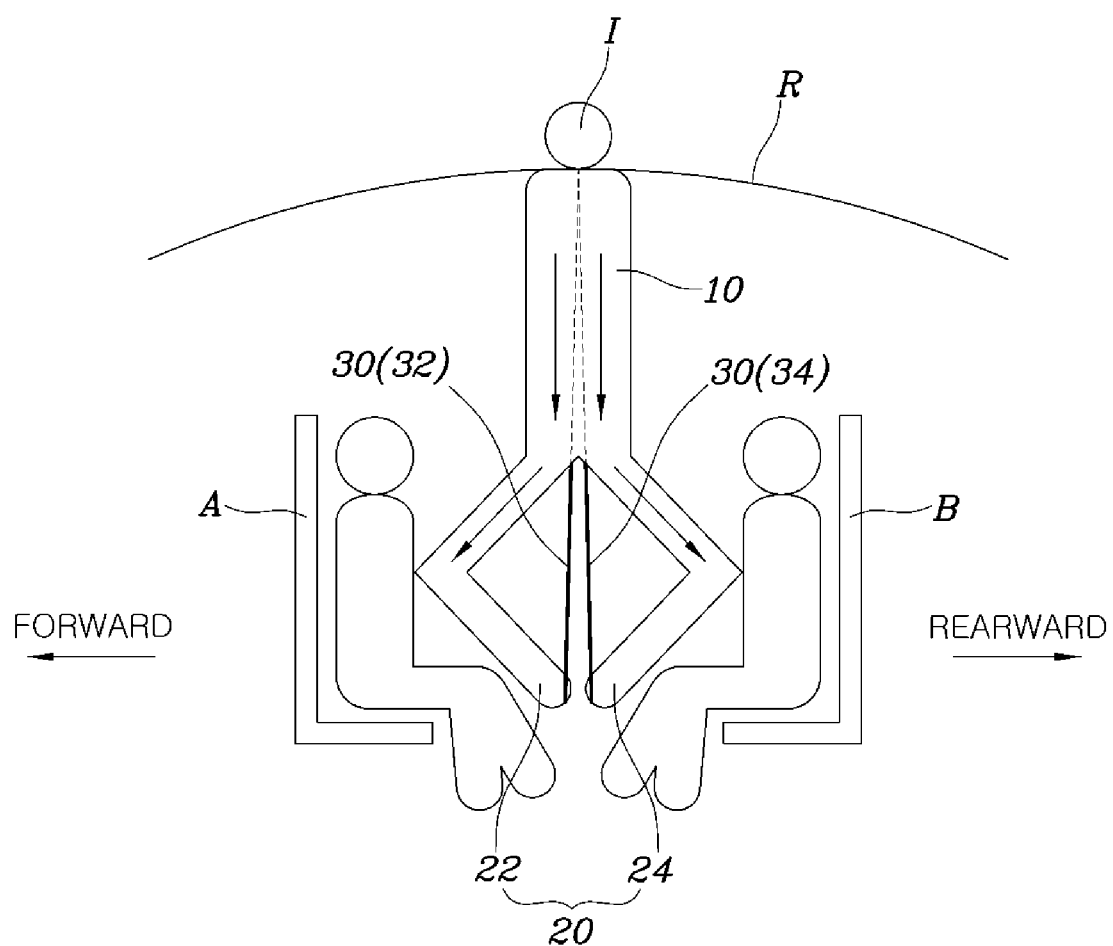
FIG. 2 is a diagram illustrating a center curtain airbag for a vehicle according to various exemplary embodiments of the present invention.
Figure 3:
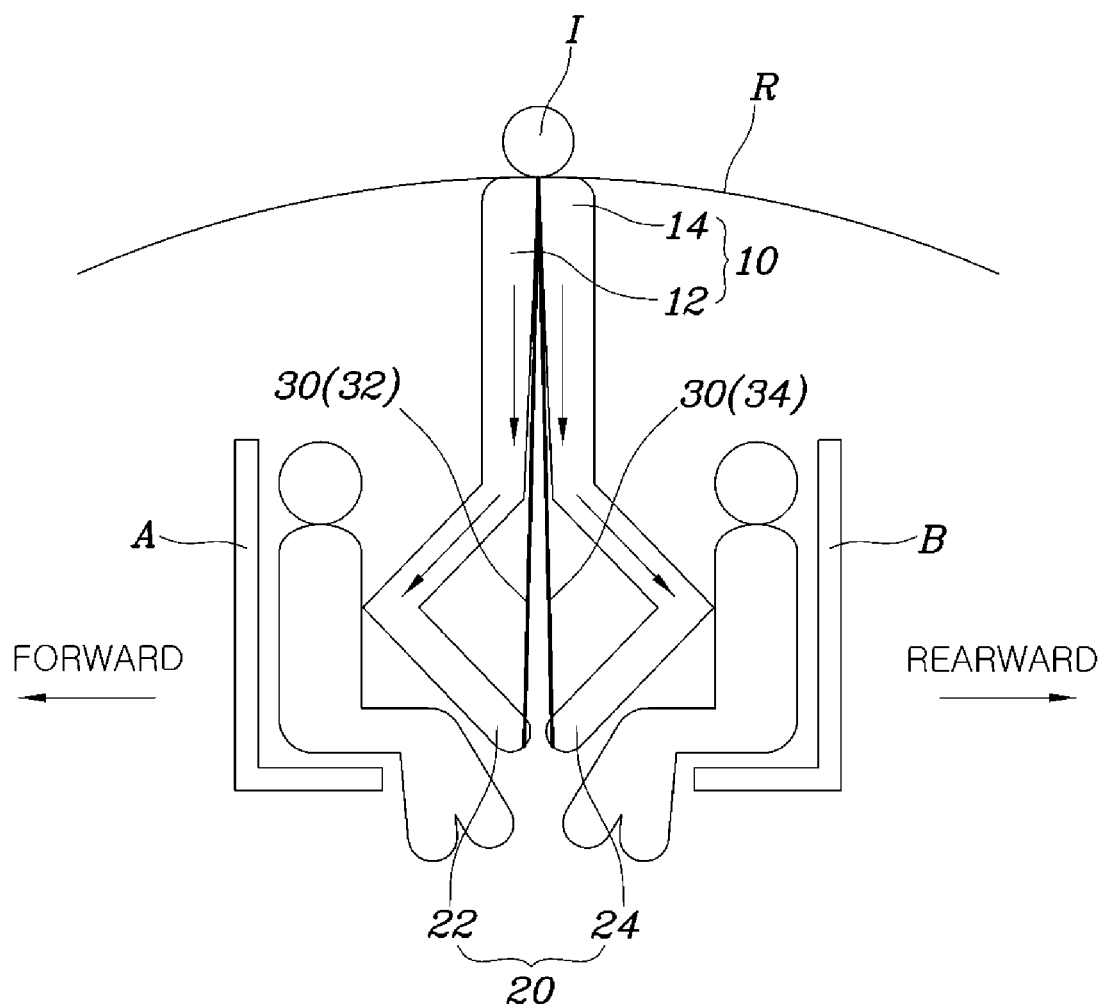
FIG. 3 is a diagram illustrating a center curtain airbag for a vehicle according to various exemplary embodiments of the present invention.
Figure 4:
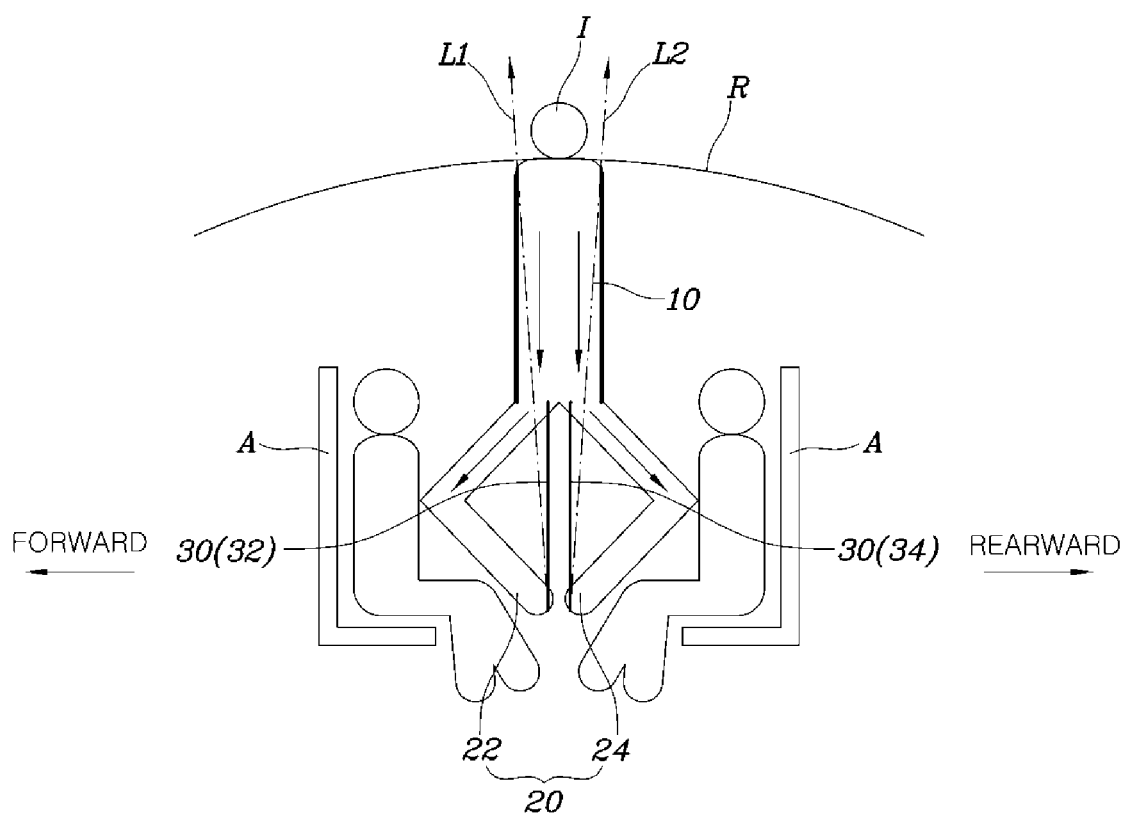
FIG. 4 is a diagram illustrating a center curtain airbag for a vehicle according to various exemplary embodiments of the present invention.
Figure 5:
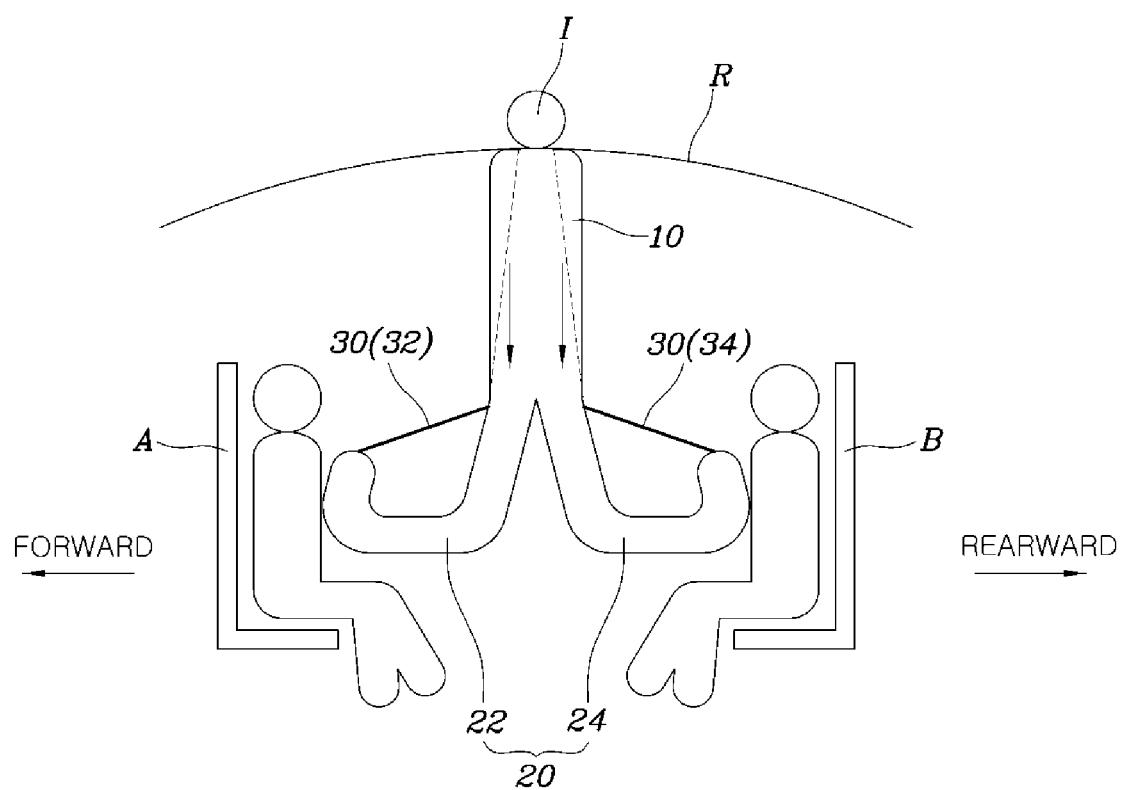
FIG. 5 is a diagram illustrating a center curtain airbag for a vehicle according to various exemplary embodiments of the present invention.

FIG. 1 is a diagram illustrating a center curtain airbag for a vehicle according to various exemplary embodiments of the present invention. FIG. 2 is a diagram illustrating a center curtain airbag for a vehicle according to various exemplary embodiments of the present invention. FIG. 3 is a diagram illustrating a center curtain airbag for a vehicle according to various exemplary embodiments of the present invention. FIG. 4 is a diagram illustrating a center curtain airbag for a vehicle according to various exemplary embodiments of the present invention. FIG. 5 is a diagram illustrating a center curtain airbag for a vehicle according to various exemplary embodiments of the present invention.

Figure 6:
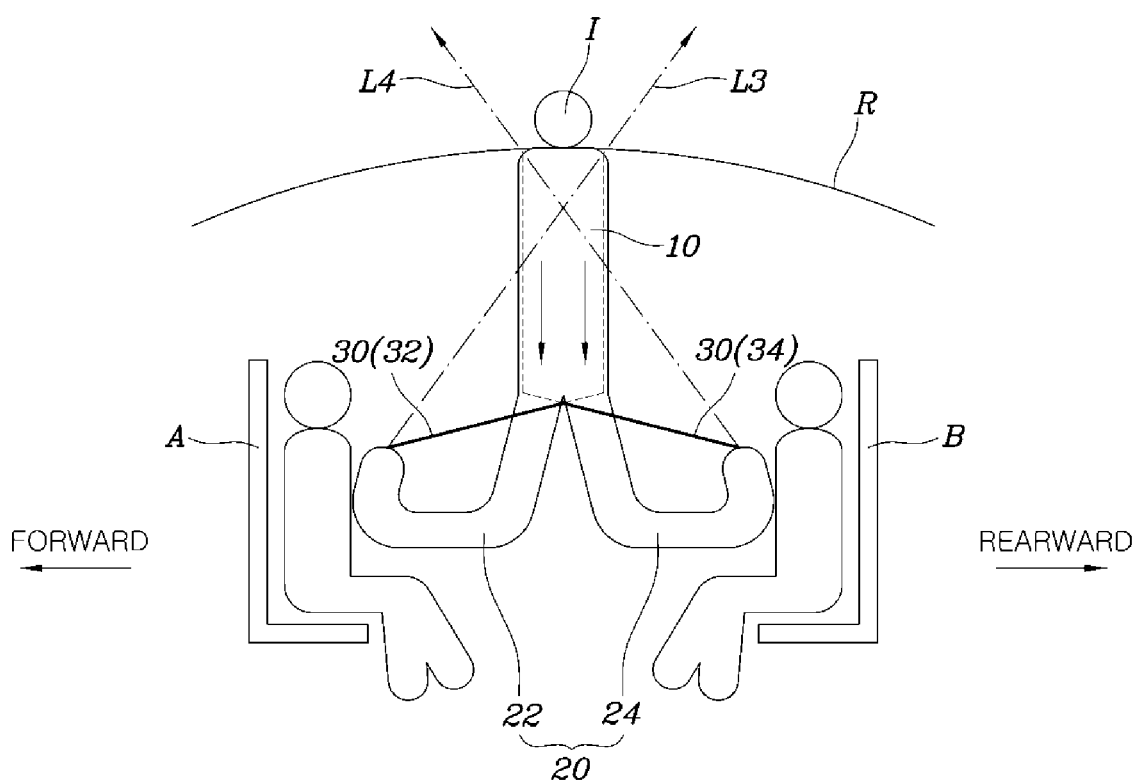
FIG. 6 is a diagram illustrating a center curtain airbag for a vehicle according to various exemplary embodiments of the present invention.

FIG. 6 is a diagram illustrating a center curtain airbag for a vehicle according to various exemplary embodiments of the present invention.

FIG. 7, FIG. 8, FIG. 9, FIG. 10, FIG. 11, FIG. 12, and FIG. 13 are diagrams illustrating a center curtain airbag for a vehicle according to an exemplary embodiment of the present invention. FIG. 14, FIG. 15, FIG. 16, FIG. 17 and FIG. 18 are diagrams illustrating various embodiments of a center curtain airbag for a vehicle according to an exemplary embodiment of the present invention.

As shown in FIG. 1, a center curtain airbag for a vehicle according to an exemplary embodiment of the present invention includes an upper cushion device 10, a lower cushion device 20, and a guide tether 30. The upper cushion device 10 is configured to deploy from a vehicle roof device R to a space between a front seat A and a rear seat B when an inflator I operates. The lower cushion device 20 connects and communicates with the upper cushion device 10 and extends downwardly from the upper cushion device 10. The guide tether 30 includes a first end portion coupled to the upper cushion device 10 or the roof device R, and a second end portion coupled to a lower end portion of the lower cushion device 20. Thus, when the upper cushion device 10 and the lower cushion device 20 deploy, the guide tether 30 provides a pulling force to the lower cushion device 20 so that the lower end portion of the lower cushion device 20 may be deformed to bend upward. Here, the roof device R corresponds to an upper end portion of the vehicle, and may be formed of a roof panel, a roof internal, or a vehicle frame.

Various aspects of the present invention are directed to providing an airbag which deploys between the front seat A and the rear seat B. The airbag includes the upper cushion device 10 and the lower cushion device 20. The lower cushion device 20 may be deformed by the guide tether 30 when the airbag is deployed. In detail, the upper cushion device 10 receives gas generated by the operation of the inflator I, and deploys from the roof device R into the space between the front seat A and the rear seat B. A lower end portion of the upper cushion device 10 connects and communicates with the lower cushion device 20, so that the lower cushion device 20 is deployed downward by gas supplied from the upper cushion device 10. The guide tether 30 is coupled to the lower cushion device 20. The guide tether 30 is fixed to the upper cushion device 10 or the roof device R. Thus, when the lower cushion device 20 deploys, the guide tether 30 provides a pulling force to the lower cushion 20 so that the lower cushion device 20 is pulled upward by the guide tether 30, whereby the lower cushion device 20 may be deformed to bend upward.

Accordingly, as the lower cushion device 20 may be deformed to bend upward, the thickness of the lower cushion device 20 with respect to the front-and-rear direction may be increased to safely protect an occupant from impact, and self-supporting force of the lower cushion device 20 is increased, compared to that of a simple planar type airbag.

In detail, as shown in FIG. 1, the lower cushion device 20 may include a front chamber 22 and a rear chamber 24 which are diverged from the lower end portion of the upper cushion device 10. The guide tether 30 may include a first tether 32, a first end portion of which is coupled to the upper cushion device 10 or the roof device R, and a second end portion of which is coupled to any one of the front chamber 22 and the rear chamber 24, and a second tether 34, a first end portion of which is coupled to the upper cushion device 10, and a second end portion of which is coupled to the other one of the front chamber 22 and the rear chamber 24.

Accordingly, the lower cushion device 20 includes the front chamber 22 and the rear chamber 24 to safely protect occupants who respectively sit on the front seat A and the rear seat B. The first tether 32 or the second tether 24 is coupled to each of the front chamber 22 and the rear chamber 24 so that, when the airbag deploys, the front chamber 22 and the rear chamber 24 are pulled upward by the first tether 32 and the second tether 34 and thus deformed to bend. Here, the length of each of the first tether 32 and the second tether 34 that extends from the junction between the upper cushion device 10 and the lower cushion device 20 is less than that of the lower cushion device 20 so that the lower cushion device 20 may be pulled upward when it is deployed.

Accordingly, the lower cushion device 20 is diverged into the front chamber 22 and the rear chamber 24, and, when the lower cushion device 20 deploys, the front chamber 22 and the rear chamber 24 are deformed and bent upward by the first tether 32 and the second tether 34, whereby the front chamber 22 can protect the front occupant from impact, and the rear chamber 24 can protect the rear occupant from impact. The above-mentioned structure can more effectively and stably protect the front occupant and the rear occupant when the front occupant and the rear occupant are positioned facing each other.

In an exemplary embodiment of the present invention, the first tether 32 or the second tether 24 is coupled to an inner side of each of the front chamber 22 and the rear chamber 24.

Hereinafter, various embodiments of the center curtain airbag for the vehicle according to an exemplary embodiment of the present invention will be described.

In various exemplary embodiments of the present invention, as shown in FIG. 1, the first end portion of the first tether 32 may be coupled to the lower end portion of the upper cushion device 10, and the second end portion thereof may be coupled to a lower end portion of the front chamber 22. The first end portion of the second tether 34 may be coupled to the upper end portion of the upper cushion device 10, and the second end portion thereof may be coupled to a lower end portion of the rear chamber 24.

The first tether 32 and the second tether 34 are disposed between the front chamber 22 and the rear chamber 24. When the lower cushion device 20 deploys, downward deployment of the front chamber 22 is limited by the first tether 32 so that the front chamber 22 is bent forward, and downward deployment of the rear chamber 24 is limited by the second tether 34 so that the rear chamber 24 is bent rearward thereof.

Accordingly, the front chamber 22 and the rear chamber 24 are deployed in an elliptical or rhombus shape, so that a sufficient thickness of the lower cushion device 20 with respect to the front-and-rear direction is ensured, thus increasing the protection effect. In the case where the front occupant and the rear occupant are positioned facing each other, the front occupant and the rear occupant provide supporting force to each other so that the front occupant and the rear occupant may be reliably retained in correct positions.

For example, in the case where the front occupant and the rear occupant are positioned facing each other, when the vehicle is involved in a front collision, the front occupant and the rear occupant are moved forward by inertia. Here, because the front chamber 22 and the rear chamber 24 are deployed such that a sufficient thickness thereof with respect to the front-and-rear direction is ensured. Thus, when the rear occupant pushes the lower cushion 20 forward, the front occupant is also brought into contact with the lower cushion device 20. Accordingly, the front occupant can also be protected from impact, and retained in the correction position.

In various exemplary embodiments of the present invention, as shown in FIG. 2, the first tether 32 and the second tether 34 may be disposed in the upper cushion device 10. The first end portion of the first tether 32 may be coupled to the upper end portion of the upper cushion device 10 or the roof device R, and the second end portion thereof may pass downward through the lower end portion of the upper cushion device 10 and be coupled to the lower end portion of the front chamber 22. The first end portion of the second tether 34 may be coupled to the upper end portion of the upper cushion device 10 or the roof device R, and the second end portion thereof may pass downward through the lower end portion of the upper cushion device 10 and be coupled to the lower end portion of the rear chamber 24.

Thus, exposed portions of the first and second tethers 32 and 34 that extend out of the lower end portion of the upper cushion 10 are disposed between the front chamber 22 and the rear chamber 24. Therefore, when the lower cushion device 20 deploys, downward deployment of the front chamber 22 is limited by the first tether 32 so that the front chamber 22 is bent forward, and downward deployment of the rear chamber 24 is limited by the second tether 34 so that the rear chamber 24 is bent rearward thereof.

Because the first end portions of the first and second tethers 32 and 34 are coupled to the upper end portion of the upper cushion device 10 or the roof device R, the first tether 32 and the second tether 34 may be forcibly fixed at the original positions thereof, and the deployment of the upper cushion device 10 and the lower cushion device 20 is reliably guided, so that the upper cushion 10 and the lower cushion device 20 may be effectively disposed between the front occupant and the rear occupant.

In various exemplary embodiments of the present invention, as shown in FIG. 3, the upper cushion device 10 may include a front branch chamber 12 and a rear branch chamber 14 which are respectively diverged forward and rearward thereof. The first tether 32 and the second tether 34 may be disposed between the front branch chamber 12 and the rear branch chamber 14. The first end portion of the first tether 32 may be coupled to the front branch chamber 12, and the second end portion thereof may be coupled to the lower end portion of the front chamber 22. The first end portion of the second tether 34 may be coupled to the rear branch chamber 14, and the second end portion thereof may be coupled to the lower end portion of the rear chamber 24.

Accordingly, the upper cushion device 10 includes the front branch chamber 12 and the rear branch chamber 14, and the front chamber 22 is coupled to a lower end portion of the front branch chamber 12 while the rear chamber 24 is coupled to a lower end portion of the rear branch chamber 24. Thus, deformation of the front chamber 22 and the rear chamber 24 by the guide tether 30 may be facilitated.

The first tether 32 and the second tether 34 are disposed between the front branch chamber 12, the front chamber 22, the rear branch chamber 14 and the rear chamber 24. When the lower cushion device 20 deploys, the front branch chamber 12 along with the front chamber 22 is bent forward by the first tether 32, and the rear branch chamber 14 along with the rear chamber 24 is bent rearward by the second tether 34.

Furthermore, because the upper cushion device 10 is diverged into the front branch chamber 12 and the rear branch chamber 14, angles at which the front chamber 22 and the rear chamber 24 are bent may be increased.

In various exemplary embodiments of the present invention, as shown in FIG. 4, the first tether 32 may be disposed in a front end portion of the upper cushion device 10. The first end portion of the first tether 32 may be coupled to the front end portion of the upper cushion device 10 or the roof device R, and the second end portion thereof may pass downward through the lower end portion of the upper cushion device 10 and be coupled to the lower end portion of the front chamber 22. The second tether 34 may be disposed in a rear end portion of the upper cushion device 10. The first end portion of the second tether 34 may be coupled to the rear end portion of the upper cushion device 10 or the roof device R, and the second end portion thereof may pass downward through the lower end portion of the upper cushion device 10 and be coupled to the lower end portion of the rear chamber 24.

Thus, portions of the first and second tethers 32 and 34 that pass through the lower end portion of the upper cushion 10 and extend downward are disposed between the front chamber 22 and the rear chamber 24. Therefore, when the lower cushion device 20 deploys, downward deployment of the front chamber 22 is limited by the first tether 32 so that the front chamber 22 is bent forward, and downward deployment of the rear chamber 24 is limited by the second tether 34 so that the rear chamber 24 is bent rearward thereof.

While the first end portion of the first tether 32 is disposed in the front end portion of the upper cushion device 10 and the first end portion of the second tether 34 is disposed in the rear end portion of the upper cushion device 10, the second end portion of the first tether 32 is coupled to the lower end portion of the front chamber 22 and the second end portion of the second tether 34 is coupled to the lower end portion of the rear chamber 24. Thus, as shown in FIG. 4, a pulling force is applied to the front chamber 22 in a direction indicated by a first imaginary line L1, and the pulling force is applied to the rear chamber 24 in a direction indicated by a second imaginary line L2.

Accordingly, directions in which the front chamber 22 and the rear chamber 24 are bent are guided by the first tether 32 and the second tether 34, whereby the front chamber 22 and the rear chamber 24 may be deployed in an elliptical or rhombus shape.

To deploy the front chamber 22 and the rear chamber 24 in an elliptical or rhombus shape, a dead zone D1 may be formed in the junction between the upper cushion device 10 and the lower cushion device 20. Furthermore, one or more dead zones D2 may be further formed in the lower cushion device 20 along a longitudinal direction of the lower cushion device 20.

Figure 7:
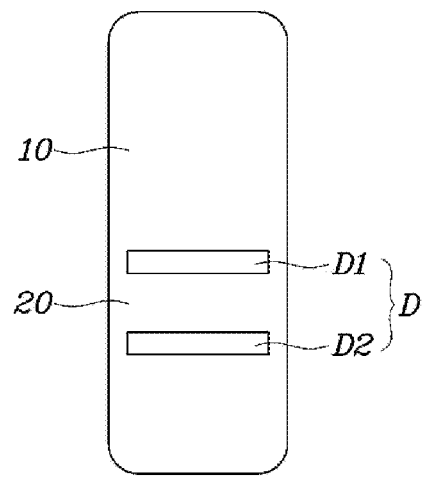
FIG. 7, FIG. 8, FIG. 9, FIG. 10, FIG. 11, FIG. 12, and FIG. 13 are diagrams illustrating a center curtain airbag for a vehicle according to an exemplary embodiment of the present invention.

As shown in FIG. 7, in the case where the dead zones D are respectively formed in the junction between the upper cushion device 10 and the lower cushion device 20 and a center portion of the lower cushion device 20, the front chamber 22 and the rear chamber 24 are bent based on the dead zone D1 when the lower cushion 20 deploys. In the present way, the directions in which the front chamber 22 and the rear chamber 24 are bent are guided by the first tether 32 and the second tether 34, whereby the shape in which the front chamber 22 and the rear chamber 24 are deployed may be determined.

In various exemplary embodiments of the present invention, as shown in FIG. 5, the first tether 32 and the second tether 34 may be disposed in the upper cushion device 10. The first end portion of the first tether 32 may be coupled to the upper end portion of the upper cushion device 10 or the roof device R, and the second end portion thereof may pass forward through the lower end portion of the upper cushion device 10 and be coupled to the lower end portion of the front chamber 22. The first end portion of the second tether 34 may be coupled to the upper end portion of the upper cushion device 10 or the roof device R, and the second end portion thereof may pass rearward through the lower end portion of the upper cushion device 10 and be coupled to the lower end portion of the rear chamber 24.

Thus, when the lower cushion device 20 deploys, the front chamber 22 is bent forward and upward by the first tether 32, and the rear chamber 24 is bent rearward and upward by the second tether 34. In other words, because the first tether 32 is disposed passing forward through the lower end portion of the upper cushion device 10, the front chamber 22 is lifted and bent forward by the first tether 32. Because the second tether 34 is disposed passing rearward through the lower end portion of the upper cushion device 10, the rear chamber 24 is lifted and bent rearward by the second tether 34.

Since the directions in which the front chamber 22 and the rear chamber 24 are bent are guided by the first tether 32 and the second tether 34 in the above-mentioned manner, the upper cushion device 10 and the lower cushion device 20 may form an overall "upside-down T" shape. Furthermore, as an overall length of the front and rear chambers 22 and 24 of the lower cushion device 20 with respect to the front-and-rear direction is increased, the front occupant and the rear occupant may be safely protected even when the front and rear occupants are positioned facing each other.

In various exemplary embodiments of the present invention, as shown in FIG. 6, the first tether 32 may be disposed in the front end portion of the upper cushion device 10. The first end portion of the first tether 32 may be coupled to the front end portion of the upper cushion device 10 or the roof device R, and the second end portion thereof may pass rearward through the lower end portion of the upper cushion device 10 and be coupled to the lower end portion of the rear chamber 24. The second tether 34 may be disposed in the rear end portion of the upper cushion device 10. The first end portion of the second tether 34 may be coupled to the rear end portion of the upper cushion device 10 or the roof device R, and the second end portion thereof may pass forward through the lower end portion of the upper cushion device 10 and be coupled to the lower end portion of the front chamber 22.

Thus, when the lower cushion device 20 deploys, the rear chamber 24 is bent upward by the first tether 32, and the front chamber 22 is bent upward by the second tether 34. In other words, because the first tether 32 is disposed passing rearward through the lower end portion of the upper cushion device 10, the rear chamber 24 is lifted and bent forward by the first tether 32. Because the second tether 34 is disposed passing forward through the lower end portion of the upper cushion device 10, the front chamber 22 is lifted and bent rearward by the second tether 34.

While the first end portion of the first tether 32 is disposed in the front end portion of the upper cushion device 10 and the first end portion of the second tether 34 is disposed in the rear end portion of the upper cushion device 10, the second end portion of the first tether 32 is coupled to the lower end portion of the rear chamber 24 and the second end portion of the second tether 34 is coupled to the lower end portion of the front chamber 22. Thus, as shown in FIG. 6, a pulling force is applied to the front chamber 22 in a direction indicated by a third imaginary line L3, and the pulling force is applied to the rear chamber 24 in a direction indicated by a fourth imaginary line L4.

Since the directions in which the front chamber 22 and the rear chamber 24 are bent are guided by the first tether 32 and the second tether 34 in the above-mentioned manner, the upper cushion device 10 and the lower cushion device 20 may form an overall "upside-down T" shape.

To deploy the front chamber 22 and the rear chamber 24 in an upwardly rolled and bent shape, a plurality of dead zones D may be formed in the lower cushion device 20 and the junction between the upper cushion device 10 and the lower cushion device 20.

Figure 8:
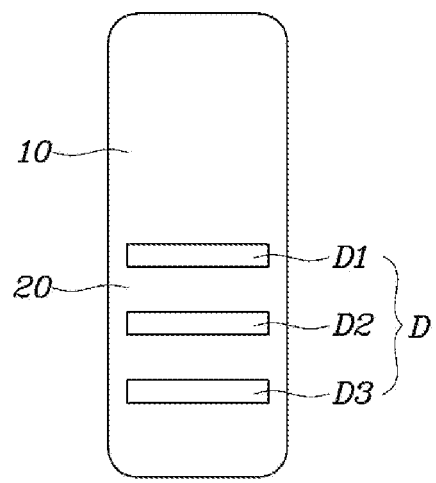

As shown in FIG. 8, a first dead zone D1 is formed in the junction between the upper cushion device 10 and the lower cushion device 20. A second dead zone D2 and a third dead zone D3 are disposed in the lower cushion device 20 at positions spaced from the first dead zone D1. Thus, when the lower cushion 20 deploys, it is bent based on the dead zones D. In the present way, the directions in which the front chamber 22 and the rear chamber 24 are bent are guided by the first tether 32 and the second tether 34, whereby the shape in which the front chamber 22 and the rear chamber 24 are deployed may be determined.

Figure 9:
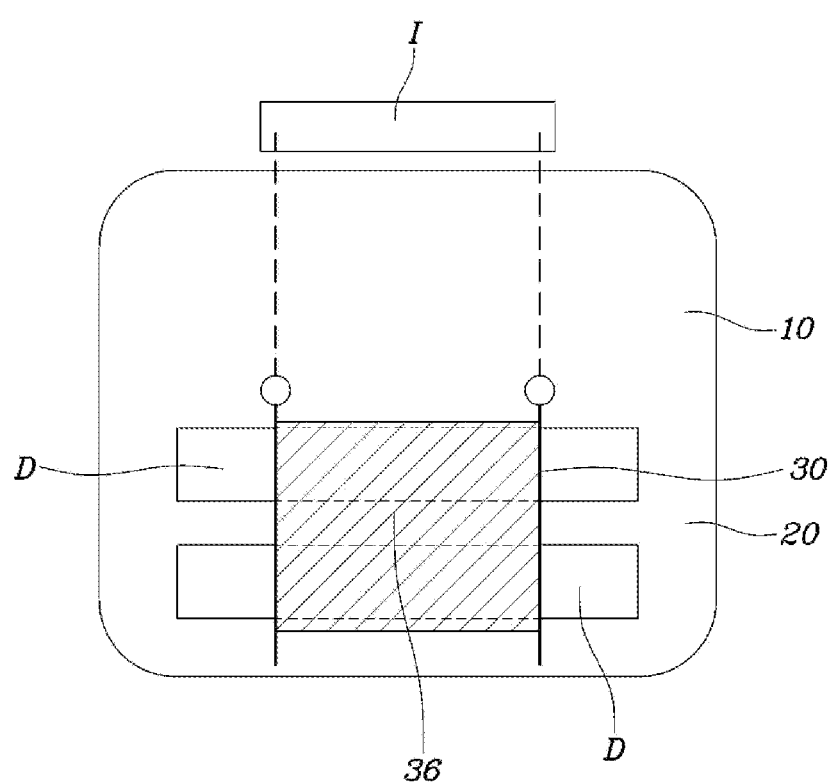

In an exemplary embodiment of the present invention, as shown in FIG. 9, each of the first tether 32 and the second tether 34 may be formed of a pair of tethers. Each of the pair of first tethers 32 and the pair of second tethers 34 may be provided with a support panel 36. Accordingly, in the case where each of the first tether 32 and the second tether 34 is formed of a pair of tethers and the support panel 36 couples each pair of tethers, the supporting force of the first tether 32 and the second tether 34 may be enhanced. Furthermore, in the case of the cushion deployment shapes of the fourth and various exemplary embodiments of the present invention, the first tether 32 and the second tether 34 are exposed upward. Here, if the support panel 36 is provided on each of the first tether 32 and the second tether 34, the body of an occupant is supported on the front chamber 22 or the rear chamber 24, and the head of the occupant is brought into contact with the support panel 36. Hence, the upper body of the occupant may be reliably retained in the correct position and protected from impact.

The center curtain airbag may further include a cutting device 40 which is disposed in the roof device R or the upper cushion device 10 and configured to cut or not to cut the guide tether 30 to adjust deployment positions of the front chamber 22 and the rear chamber 24.

Here, the cutting device 40 may operate under control of a controller 50 to be described below, and employ a scheme of cutting the guide tether 30 using a cutting blade and an electromagnet. A technique of cutting the tether in a response to an input signal is well-known to those skilled in the present art; therefore, detailed description thereof will be omitted.

The center curtain airbag may further include the controller 50 configured to control the cutting device 40 and receive information related to the positions of the front seat A and the rear seat B. In the case where the front seat A and the rear seat B are oriented toward the deployment position of the upper cushion device 10, the controller 50 controls the cutting device 40 not to cut the first tether 32 and the second tether 34, thus allowing the front chamber 22 and the rear chamber 24 to be deformed in bent shapes when inflating.

Here, the controller 50 may receive the position information related to the front seat A and the rear seat B from a sensor disposed in each seat. In the case of a swivel seat, the positions of the front seat A and the rear seat B may be determined by a typical seat position control operation.

Figure 10:
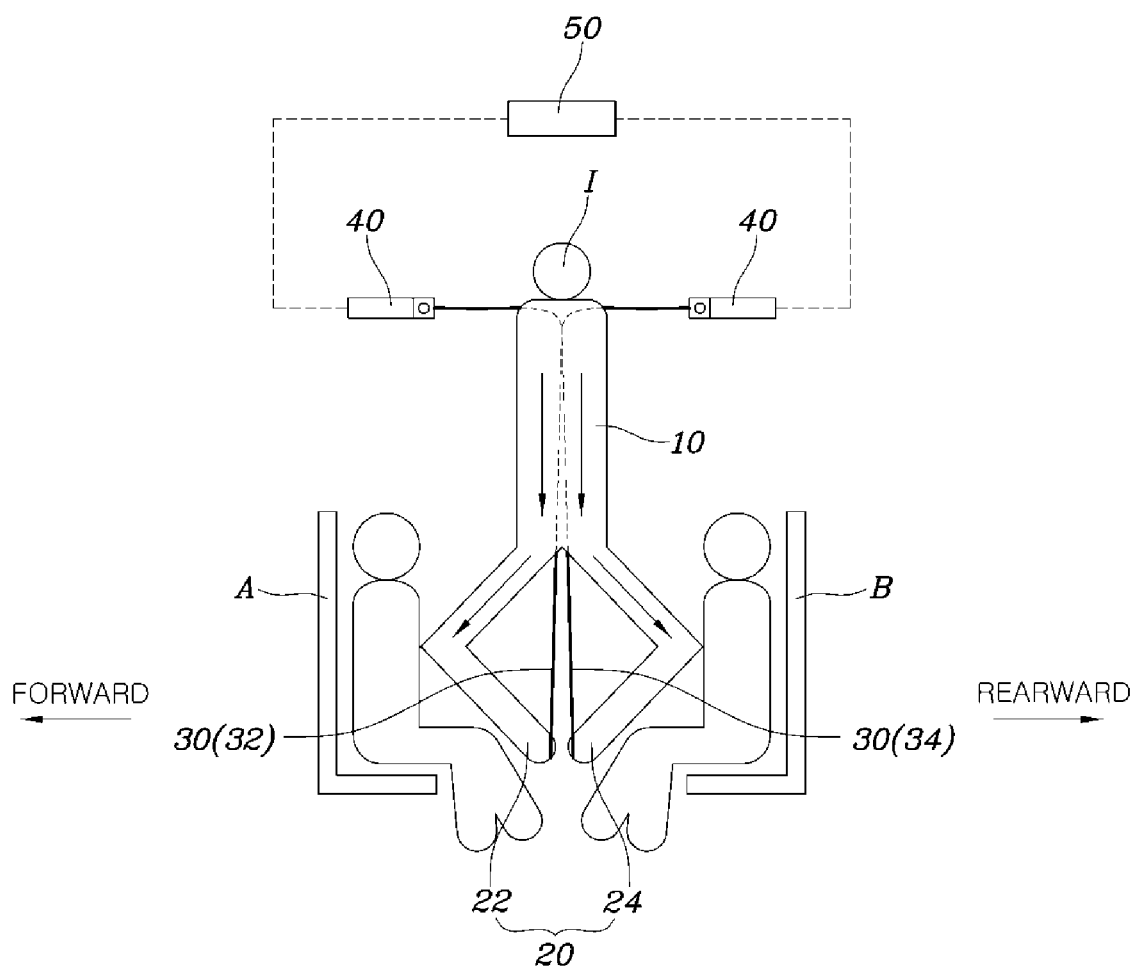

As shown in FIG. 10, in the case where the front seat A and the rear seat B are oriented toward the deployment of the upper cushion device 10 and disposed facing each other, the controller 50 controls the cutting device 40 not to cut the first tether 32 and the second tether 34, so that the front chamber 22 and the rear chamber 24 are deformed in bent shapes when inflating. Accordingly, in the case where the front chamber 22 and the rear chamber 24 are deformed in bent shapes when inflating, a sufficient thickness of the lower cushion device 20 with respect to the front-and-rear direction is ensured, thus increasing the protection effect. In the case where the front occupant and the rear occupant are positioned facing each other, the front occupant and the rear occupant provide supporting force of the airbag to each other so that the front occupant and the rear occupant may be reliably retained in correct positions.

In the case where the front seat A and the rear seat B are disposed such that only any one thereof is oriented toward the deployment position of the upper cushion device 10, the controller 50 may control the cutting device 40 not to cut one of the first tether 32 and the second tether 34 that corresponds to the associated seat.

Figure 11:
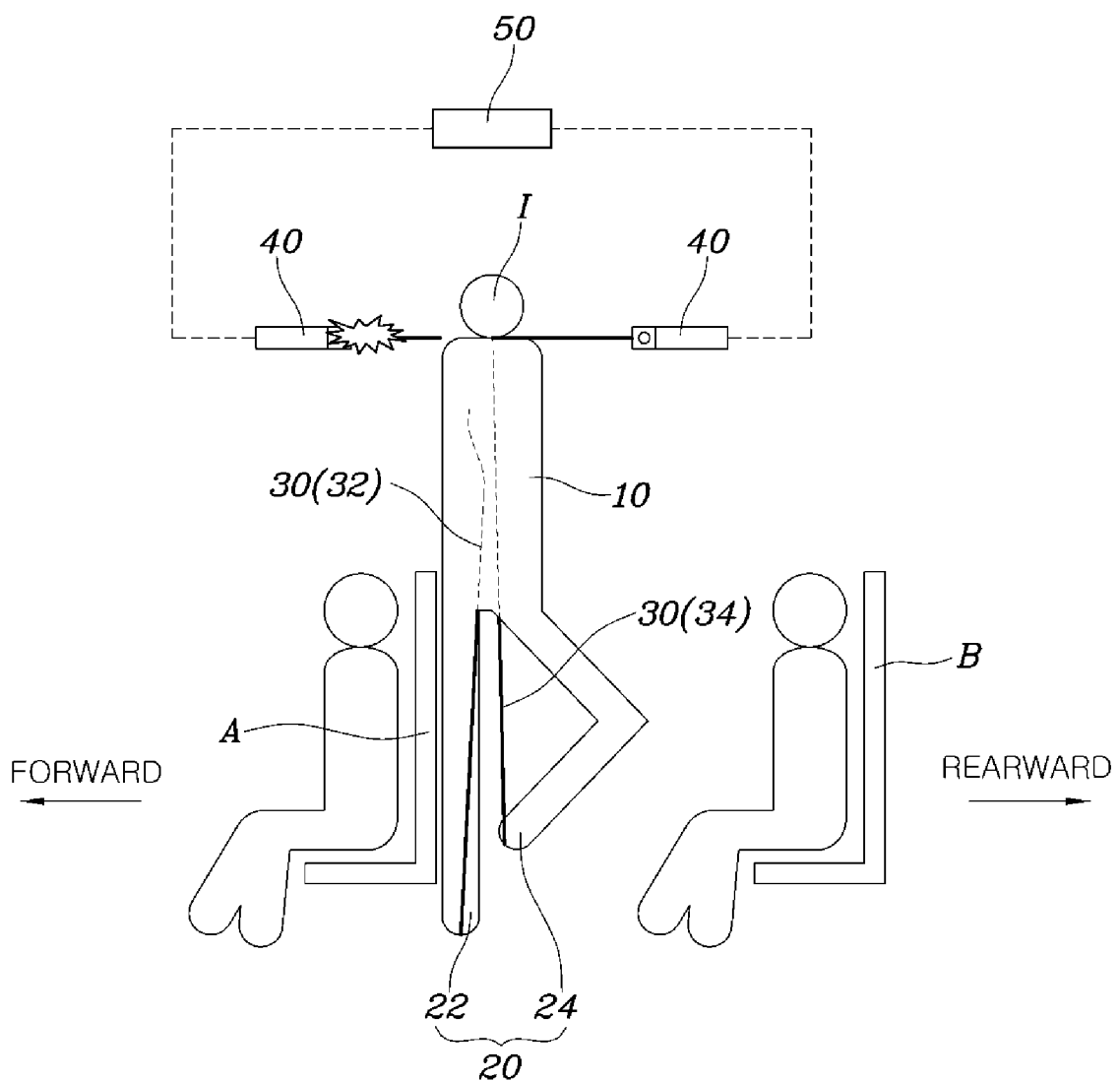

For example, as shown in FIG. 11, in the case where only the rear seat B is oriented toward the deployment position of the upper cushion device 10, the front seat A may be protected by an airbag provided ahead of the front seat A. In the instant case, because the front seat A is a driver's seat, the front seat A is protected by a driver airbag if the front chamber 22 of the lower cushion device 20 is deployed in bent shape when the front seat A is oriented in the forward direction opposite to the upper cushion device 10, the front chamber 22 may strike the occupant who sits on the front seat A, or the lower cushion device 20 may be blocked by the front seat A and thus deployed in an incorrect way.

Therefore, in the case where only the rear seat B is oriented toward the deployment position of the upper cushion device 10, the controller 50 controls the cutting device 40 to cut the first tether 32. In the instant case, the front chamber 22 coupled to the first tether 32 is linearly deployed downward to prevent the front seat A from interfering with the deployment of the front chamber 22. When inflating, only the rear chamber 24 facing the rear seat B may be deformed in a bent shape by the second tether 34, thus safely protecting the occupant who sits on the rear seat B.

In the case where the front seat A and the rear seat B are oriented in directions opposite to the deployment position of the upper cushion device 10, the controller 50 may control the cutting device 40 to cut both the first tether 32 and the second tether 34.

Figure 12:
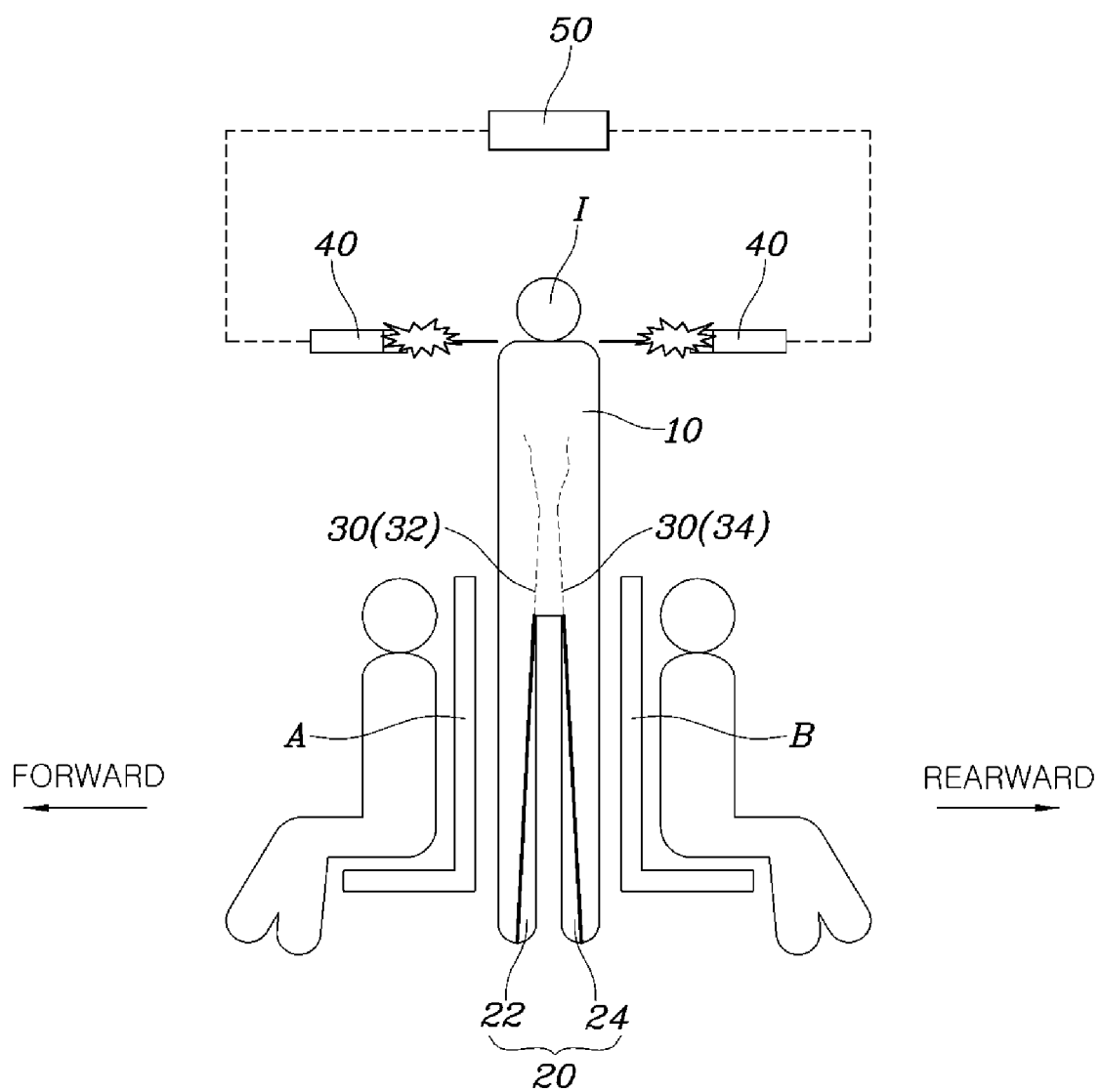

As shown in FIG. 12, in the case where the front seat A and the rear seat B are oriented in the directions opposite to the deployment position of the upper cushion device 10, the demand for the upper cushion device 10 and the lower cushion device 20 to directly protect the occupants who respectively sit on the front seat A and the rear seat B is reduced. Therefore, the controller 50 may control the cutting device 40 to cut both the first tether 32 and the second tether 34 so that both the front chamber 22 coupled to the first tether 32 and the rear chamber 24 coupled to the second tether 34 are deployed downward and disposed between the front seat A and the rear seat B. Here, the upper cushion device 10 and the lower cushion device 20 may be deployed into the space between the front seat A and the rear seat B without being interfered by the front seat A or the rear seat B. Hence, the upper cushion device 10 and the lower cushion device 20 may function as a typical center curtain airbag, thus limiting movement of an object or an occupant to the front seat A or the rear seat B.

The controller 50 may also receive information related to whether an occupant sits on the front seat A or the rear seat B. In the case where there is no occupant on the front seat A or the rear seat B, the controller 50 control the cutting device 40 to cut one of the first tether 32 and the second tether 34 that corresponds to the associated seat.

Here, the controller 50 may determine whether an occupant sits on each seat using a sensor disposed in the seat. With regard to a seat on which no occupant is present, the controller 50 makes the corresponding one of the front chamber 22 and the rear chamber 24 not deployed to be deformed in a bent shape.

Figure 13:
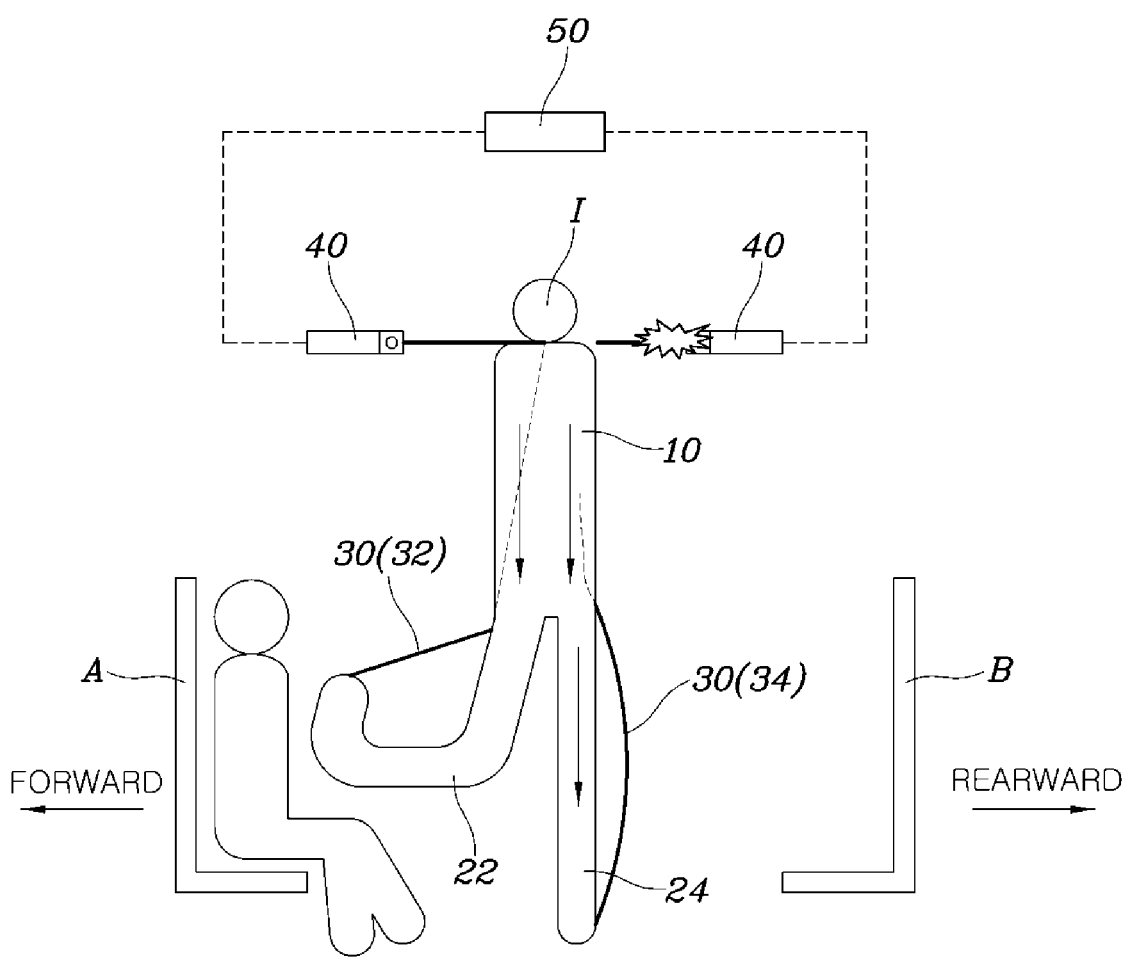

For example, as shown in FIG. 13, in the case where there is no occupant on the rear seat B and an occupant sits on only the front seat A, the controller 50 controls the cutting device 40 to cut the second tether 34 so that only the front chamber 22 coupled to the first tether 32 may be deformed in a bent shape and the rear chamber 24 is deployed toward a floor surface of the vehicle. Accordingly, the occupant who sits on the front seat A may be protected by the front chamber 22, and the supporting force is secured because the rear chamber 24 comes into contact with the floor surface.

The above-stated control operation of the controller 50 may correspond to the second, third, or various exemplary embodiments of the present invention. In the case of the various exemplary embodiments of the present invention, because the first tether 32 is coupled to the rear chamber 24 and the second tether 34 is coupled to the front chamber 22 on the contrary to the other embodiments, the control operation of the controller 50 may be performed in reverse.

With regard to whether an occupant sits on each of the front seat A and the rear seat B, various embodiments may be applied to the cutting device 40 and the controller 50 depending on a connection position and a connection length of the guide tether 30.

More specifically, the guide tether 30 may include a first tether 32, a second tether 34, a third tether 36, and a fourth tether 37. Each of the first tether 32 and the third tether 36 may include a first end portion coupled to the upper cushion device 10 or the roof device R, and a second end portion passing downward through the lower end portion of the upper cushion device 10 and coupled to the front chamber 22. Each of the second tether 34 and the fourth tether 37 may include a first end portion coupled to the upper cushion device 10 or the roof device R, and a second end portion passing downward through the lower end portion of the upper cushion 10 and coupled to the rear chamber 24. The third tether 36 may be shorter than the first tether 32. The fourth tether 37 may be shorter than the second tether 34.

Here, each of the first tether 32, the second tether 34, the third tether 36, and the fourth tether 37 is coupled to the cutting device 40. Depending on whether a specific tether is cut, the shape in which the front chamber 22 and the rear chamber 24 are deployed may be changed.

Figure 14:
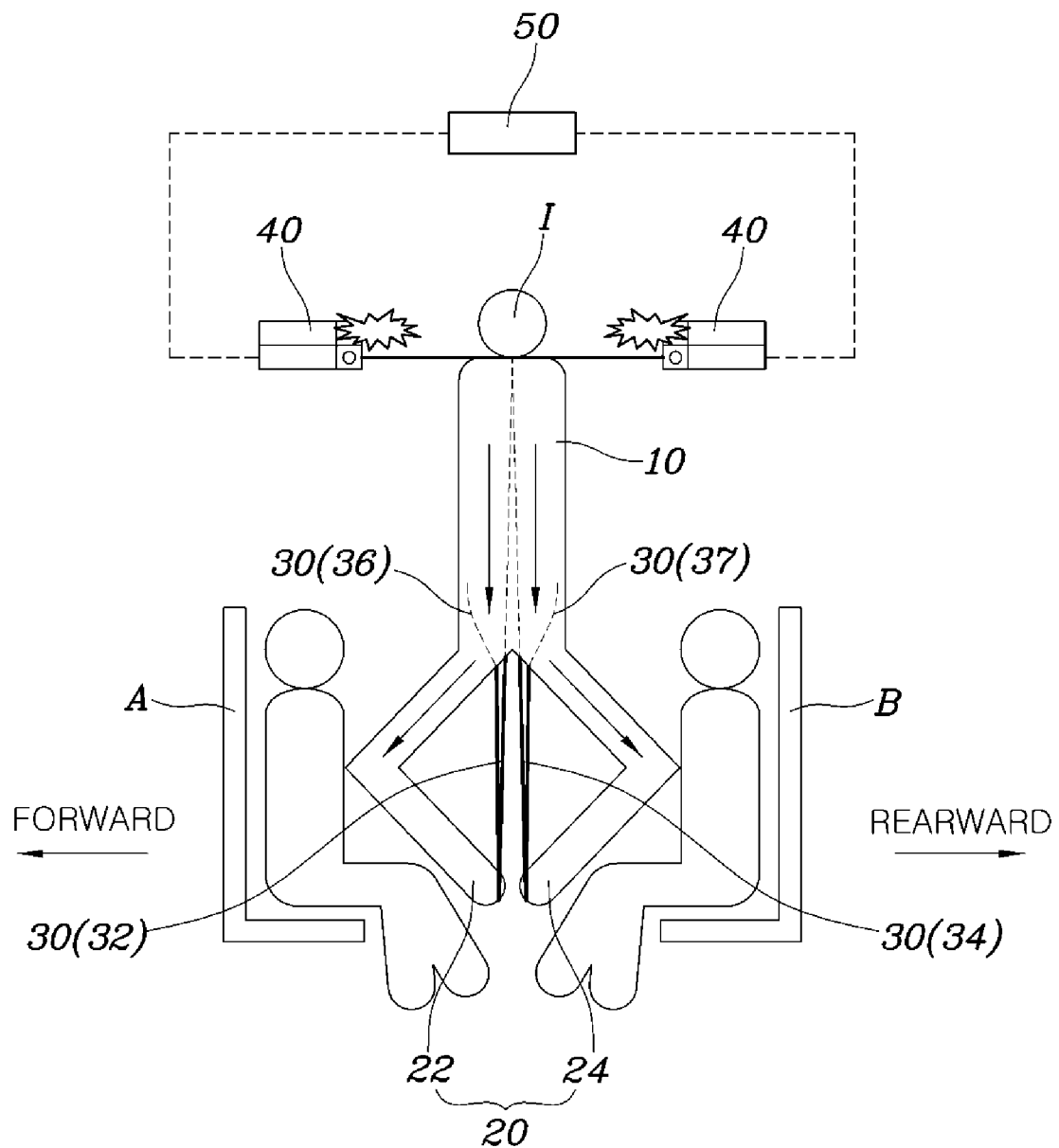
FIG. 14, FIG. 15, FIG. 16, FIG. 17 and FIG. 18 are diagrams illustrating various embodiments of a center curtain airbag for a vehicle according to an exemplary embodiment of the present invention.

More specifically, as shown in FIG. 14, in the case where occupants respectively sit on the front seat A and the rear seat B that are oriented toward the deployment position of the upper cushion device 10, the controller 50 may control the cutting device 40 to cut the third tether 36 and the fourth tether 37 but not to cut the first tether 32 and the second tether 34.

That is, when inflating, the front chamber 22 and the rear chamber 24 may be deformed in bent shapes by the first tether 32 and the second tether 34 and deployed to have appropriate sizes to protect the front occupant and the rear occupant with respect to the front-and-rear direction thereof. Hence, the front occupant and the rear occupant who are positioned facing each other may provide supporting force to the airbag toward each other, whereby the front occupant and the rear occupant may be retained in their correct positions.

Figure 15:
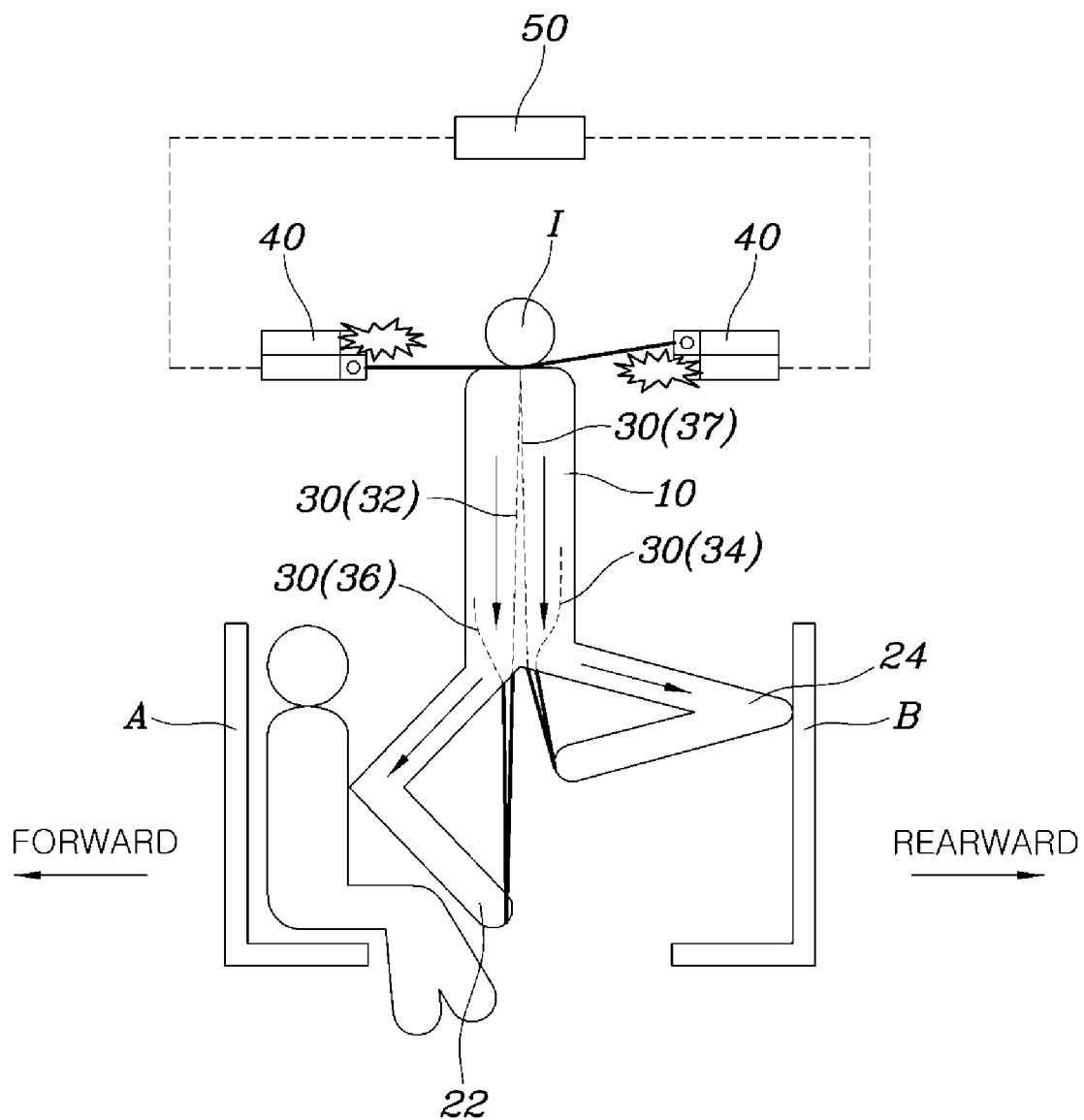

As shown in FIG. 15, in the case where an occupant sits on the front seat A and there is no occupant on the rear seat B while the front seat A and the rear seat B are oriented toward the deployment position of the upper cushion device 10, the controller 50 may control the cutting device 40 to cut the first tether 32 and the fourth tether 37 but not to cut the second tether 34 and the third tether 36.

Accordingly, as shown in FIG. 15, when inflating, the front chamber 22 may be deformed in a bent shape by the first tether 32 and deployed to have an appropriate size to protect the front occupant. By the fourth tether 37 having a comparatively small length, the rear chamber 24 may be deformed in a bent shape with an angle less than that of the front chamber 22 and thus brought into contact with and supported by a seatback of the rear seat B. In other words, because the rear chamber 24 may be deformed in a bent shape with a small angle by the fourth tether 37 which is shorter than the second tether 34, the length that the rear chamber 24 protrudes rearward is increased, whereby the rear chamber 24 may be supported by the rear seat B. Consequently, when coming into contact with the front chamber 22, the occupant who sits on the front seat A may be reliably protected by the supporting force generated from the rear chamber 24.

Accordingly, as an airbag deployment scheme for the case where an occupant sits on only the front seat A while the front seat A and the rear seat B are oriented toward the deployment position of the upper cushion 10, the cutting device 40 may be controlled to cut the second tether 34, the third tether 36, and the fourth tether 37 but not to cut the first tether 32, so that the front chamber 22 may be deformed in a bent shape by the first tether 32 and brought into contact with the front occupant, and the rear chamber 24 may be deployed toward the floor surface of the vehicle and brought into contact with the floor surface or brought into contact with and supported by a seat cushion of the rear seat B. Consequently, the front occupant may be reliably protected by the front chamber 22 while the supporting force is secured by the rear chamber 24.

The foregoing description has been made for the case where the occupant sits on only the front seat A. Likewise, when an occupant sits on only the rear seat B, the rear occupant can also be reliably protected by cutting the corresponding tethers opposite to the case where the occupant sits on only the front seat A.

Figure 16:
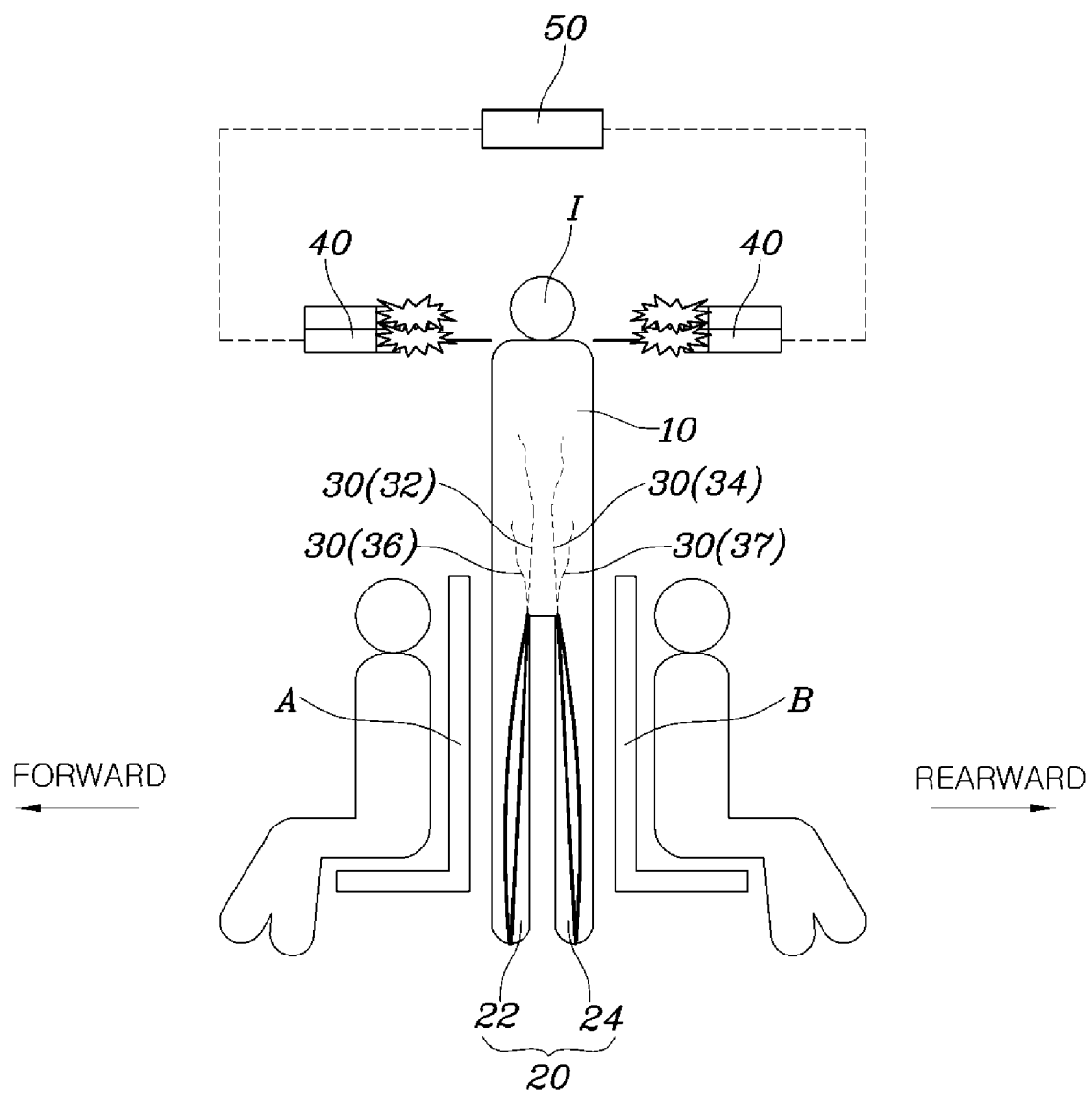

As shown in FIG. 16, in the case where the front seat A and the rear seat B are oriented in directions opposite to the deployment position of the upper cushion device 10, the controller 50 may control the cutting device 40 to cut the first tether 32, the second tether 34, the third tether 36, and the fourth tether 37.

In the instant case, both the front chamber 22 coupled to the first tether 32 and the third tether 36 and the rear chamber 24 coupled to the second tether 34 and the fourth tether 37 are deployed downward and disposed between the front seat A and the rear seat B. Thus, the upper cushion device 10 and the lower cushion device 20 may be deployed into the space between the front seat A and the rear seat B without being interfered by the front seat A or the rear seat B. Hence, the upper cushion device 10 and the lower cushion device 20 may function as a typical center curtain airbag, thus limiting movement of an object or an occupant to the front seat A or the rear seat B.

In another exemplary embodiment of the present invention, the guide tether 30 may include a first tether 32, a second tether 34, a fifth tether 38, and a sixth tether 39. Each of the first tether 32 and the fifth tether 38 may include a first end portion coupled to the upper cushion device 10 or the roof device R, and a second end portion passing forward through the lower end portion of the upper cushion device 10 and coupled to the front chamber 22. Each of the second tether 34 and the sixth tether 39 may include a first end portion coupled to the upper cushion device 10 or the roof device R, and a second end portion passing rearward through the lower end portion of the upper cushion 10 and coupled to the rear chamber 24. The fifth tether 38 may be longer than the first tether 32. The sixth tether 39 may be longer than the second tether 34.

Here, each of the first tether 32, the second tether 34, the fifth tether 38, and the sixth tether 39 is coupled to the cutting device 40. Depending on whether a specific tether is cut, the shape in which the front chamber 22 and the rear chamber 24 are deployed may be changed.

Figure 17:
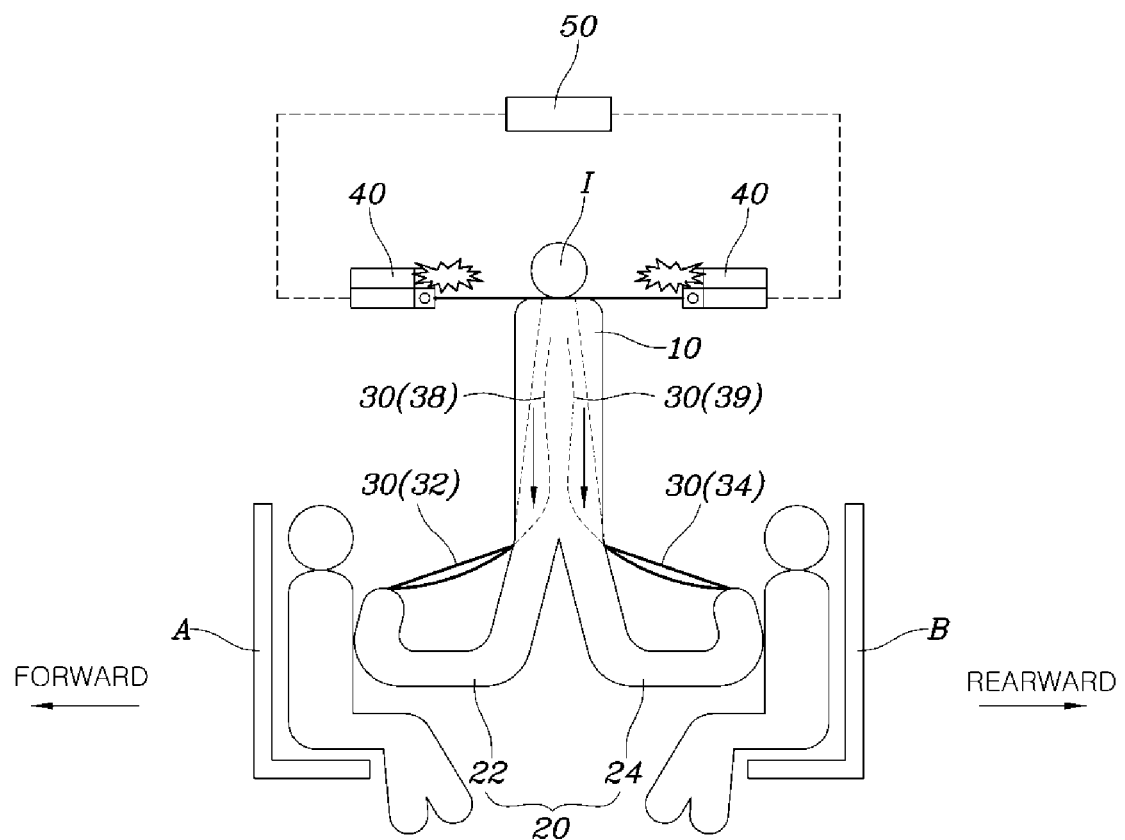

More specifically, as shown in FIG. 17, in the case where occupants respectively sit on the front seat A and the rear seat B that are oriented toward the deployment position of the upper cushion device 10, the controller 50 may control the cutting device 40 to cut the fifth tether 58 and the sixth tether 39 but not to cut the first tether 32 and the second tether 34.

That is, when inflating, the front chamber 22 and the rear chamber 24 may be deformed in bent shapes by the first tether 32 and the second tether 34 and deployed to have appropriate sizes to protect the front occupant and the rear occupant. Hence, the front occupant and the rear occupant who are positioned facing each other may provide supporting force to the airbag toward each other, whereby the front occupant and the rear occupant may be retained in their correct positions.

Figure 18:
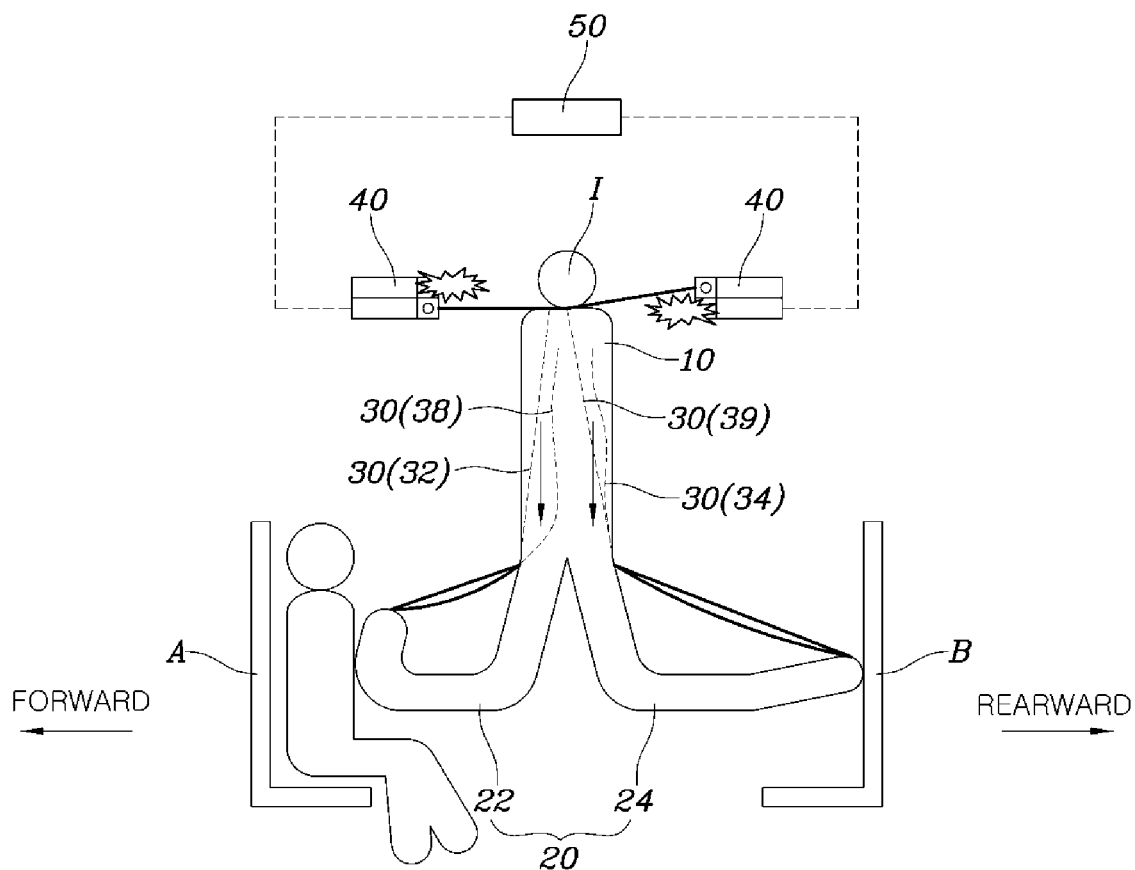

As shown in FIG. 18, in the case where an occupant sits on the front seat A and there is no occupant on the rear seat B while the front seat A and the rear seat B are oriented toward the deployment position of the upper cushion device 10, the controller 50 may control the cutting device 40 to cut the first tether 32 and the sixth tether 39 but not to cut the second tether 34 and the fifth tether 38.

Accordingly, when inflating, the front chamber 22 may be deformed in a bent shape by the first tether 32 and deployed to have an appropriate size to support the front occupant, thus protecting the front occupant. By the fourth tether 39 having a comparatively large length, the rear chamber 24 may be deformed in a bent shape with an angle greater than that of the front chamber 22 and thus brought into contact with and supported on the seatback of the rear seat B.

In other words, as shown in FIG. 18, because the rear chamber 24 may be deformed in a bent shape with a large angle by the sixth tether 39 which is longer than the second tether 34, the length that the rear chamber 24 protrudes rearward is increased, whereby the rear chamber 24 may be supported on the rear seat B. Consequently, when coming into contact with the front chamber 22, the occupant who sits on the front seat A may be reliably protected by the supporting force generated from the rear chamber 24.

As described above, the center curtain airbag according to an exemplary embodiment of the present invention includes a plurality of tethers coupling the front chamber 22 and the rear chamber 24. Depending on the position and length of each tether, airbag structures according to various embodiments may be embodied.

The center curtain airbag for the vehicle having the above-mentioned configuration may prevent the front occupant and the rear occupant from colliding with each other when a vehicle collision occurs. Furthermore, because self-supporting force of the center curtain airbag is secured, regardless of whether the front occupant or the rear occupant is present, all of the occupants may be safely protected.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A center curtain airbag for a vehicle, the center curtain airbag comprising:
    an upper cushion device configured to be deployed from a roof device of the vehicle into a space between a front seat and a rear seat when an inflator operates;
    a lower cushion device connecting and communicating with the upper cushion device and configured to extend downwardly from the upper cushion device when the inflator operates; and
    a guide tether including a first end portion coupled to the upper cushion device or the roof device, and a second end portion coupled to a lower end portion of the lower cushion device, the guide tether being configured to provide, when the lower cushion device along with the upper cushion device is deployed, a pulling force to the lower cushion device so that the lower cushion device is configured to be deformed to protrude toward the front seat or the rear seat,
    wherein the lower cushion device includes a front chamber and a rear chamber that are diverged from a lower end portion of the upper cushion device forward and rearward of the vehicle, respectively, and
    wherein the guide tether includes:
        a first tether including a first end portion coupled to the upper cushion device or the roof device, a second end portion coupled to one of the front chamber and the rear chamber; and
        a second tether including a first end portion coupled to the upper cushion device or the roof device, and a second end portion coupled to a remaining one of the front chamber and the rear chamber, and
    wherein the center curtain airbag further comprises:
        a cutting device disposed in the roof device or the upper cushion device and configured to cut or not to cut the guide tether so that deployment positions of the front chamber and the rear chamber are adjusted.

2. The center curtain airbag according to claim 1,
wherein the first tether and the second tether are disposed in the upper cushion device,
wherein the first end portion of the first tether is coupled to the upper cushion device or the roof device, and the second end portion thereof passes downward through the lower end portion of the upper cushion device and is coupled to a lower end portion of the front chamber, and
wherein the first end portion of the second tether is coupled to the upper cushion device or the roof device, and the second end portion thereof passes downward through the lower end portion of the upper cushion device and is coupled to a lower end portion of the rear chamber.

3. The center curtain airbag according to claim 1,
wherein the upper cushion device includes a front branch chamber and a rear branch chamber that are diverged forward and rearward thereof, respectively,
wherein the first tether and the second tether are disposed between the front branch chamber and the rear branch chamber, and
wherein the first end portion of the first tether is coupled to the front branch chamber, and the second end portion thereof is coupled to a lower end portion of the front chamber, while the front end portion of the second tether is coupled to the rear branch chamber, and the second end portion thereof is coupled to a lower end portion of the rear chamber.

4. The center curtain airbag according to claim 1,
wherein the first tether is disposed in a front end portion of the upper cushion device, and the first end portion of the first tether is coupled to the upper cushion device or the roof device while the second end portion thereof passes downward through the lower end portion of the upper cushion device and is coupled to a lower end portion of the front chamber, and
wherein the second tether is disposed in a rear end portion of the upper cushion device, and the first end portion of the second tether is coupled to the upper cushion device or the roof device while the second end portion thereof passes downward through the lower end portion of the upper cushion device and is coupled to a lower end portion of the rear chamber.

5. The center curtain airbag according to claim 1,
wherein the first tether and the second tether are disposed in the upper cushion device,
wherein the first end portion of the first tether is coupled to the upper cushion device or the roof device, and the second end portion thereof passes forward through the lower end portion of the upper cushion device and is coupled to a lower end portion of the front chamber, and
wherein the first end portion of the second tether is coupled to the upper cushion device or the roof device, and the second end portion thereof passes rearward through the lower end portion of the upper cushion device and is coupled to a lower end portion of the rear chamber.

6. The center curtain airbag according to claim 1, wherein the first tether is disposed in a front end portion of the upper cushion device, and the first and portion of the first tether is coupled to the upper cushion device or the roof device while the second end portion thereof passes rearward through the lower end portion of the upper cushion device and is coupled to a lower end portion of the rear chamber, and
wherein the second tether is disposed in a rear end portion of the upper cushion device, and the first end portion of the second tether is coupled to the upper cushion device or the roof device while the second end portion thereof passes forward through the lower end portion of the upper cushion device and is coupled to a lower end portion of the front chamber.

7. The center curtain airbag according to claim 1, wherein each of the first tether and the second tether includes a pair of tethers, and a pair of first tethers and another pair of second tethers are respectively provided with support panels.

8. The center curtain airbag according to claim 1, wherein a dead zone is formed in a junction of the upper cushion device and the lower cushion device.

9. The center curtain airbag according to claim 8, wherein one or more dead zones are further formed in the lower cushion device along a longitudinal direction of the lower cushion device.

10. The center curtain airbag according to claim 1, further including a controller configured to control the cutting device and receive position information related to the front seat and the rear seat,
wherein, when the front seat and the rear seat are oriented toward a deployment position of the upper cushion device, the controller is configured to control the cutting device not to cut the first tether and the second tether so that the front chamber and the rear chamber are deformed in bent shapes when inflating.

11. The center curtain airbag according to claim 10, wherein, when one of the front seat and the rear seat is oriented toward the deployment position of the upper cushion device, the controller is configured to control the cutting device not to cut one of the first tether and the second tether that corresponds to associated seat.

12. The center curtain airbag according to claim 10, wherein, when the front seat and the rear seat are oriented in directions opposite to the deployment position of the upper cushion device, the controller is configured to control the cutting device to cut the first tether and the second tether.

13. The center curtain airbag according to claim 10,
wherein the controller further receives information related to whether an occupant sits on each of the front seat and the rear seat, and
wherein, when there is no occupant on the front seat or the rear seat, the controller is configured to control the cutting device to cut one of the first tether and the second tether that corresponds to associated seat.

14. A center curtain airbag for a vehicle, the center curtain airbag comprising:
an upper cushion device configured to be deployed from a roof device of the vehicle into a space between a front seat and a rear seat when an inflator operates;
a lower cushion device connecting and communicating with the upper cushion device and configured to extend downwardly from the upper cushion device when the inflator operates:
a guide tether including a first end portion coupled to the upper cushion device or the roof device, and a second end portion coupled to a lower end portion of the lower cushion device, the guide tether being configured to provide, when the lower cushion device along with the upper cushion device is deployed, a pulling force to the lower cushion device so that the lower cushion device is configured to be deformed to protrude toward the front seat or the rear seat, wherein the guide tether includes:

a first tether and a third tether each including a first end portion coupled to the upper cushion device or the roof device, and a second end portion passing downward through the lower end portion of the upper cushion device and coupled to a front chamber; and a second tether and a fourth tether each including a first end portion coupled to the upper cushion device or the roof device, and a second end portion passing downward through the lower end portion of the upper cushion device and coupled to the rear chamber, and wherein the third tether is shorter than the first tether, and the fourth tether is shorter than the second tether.

15. The center curtain airbag according to claim 14, further comprising:

a cutting device disposed in the roof device or the upper cushion device and configured to cut or not to cut the guide tether so that deployment positions of the front chamber and the rear chamber are adjusted; and controller configured to control the cutting device and receive position information related to the front seat and the rear seat, wherein, when the front seat and the rear seat are oriented toward a deployment position of the upper cushion device and occupants respectively sit on the front seat and the rear seat, the controller is configured to control the cutting device to cut the third tether and the fourth tether and not to cut the first tether and the second tether.

16. The center curtain airbag according to claim 14, wherein, when the front seat and the rear seat are oriented toward a deployment position of the upper cushion device and an occupant sits on the front seat while there is no occupant on the rear seat, the controller is configured to control the cutting device to cut the second tether and the third tether and not to cut the first tether and the fourth tether.

17. The center curtain airbag according to claim 14, wherein, when the front seat and the rear seat are oriented toward a deployment position of the upper cushion device and an occupant sits on the front seat while there is no occupant on the rear seat, the controller is configured to control the cutting device to cut the second tether, the third tether, and the fourth tether and not to cut the first tether.

18. The center curtain airbag according to claim 14, wherein, when the front seat and the rear seat are oriented in directions opposite to a deployment position of the upper cushion device, the controller is configured to control the cutting device to cut the first tether, the second tether, the third tether, and the fourth tether.

* * * * *